United States Patent [19]

Takeda et al.

[11] Patent Number: 5,412,440
[45] Date of Patent: May 2, 1995

[54] RIMLESS SPECTACLES WITH ADJUSTABLE TEMPLES AND LENSES

[75] Inventors: Kinji Takeda; Yukiko Kori, both of Fukui, Japan

[73] Assignee: Kabushiki Kaisha Takeda, Fukui, Japan

[21] Appl. No.: 163,056

[22] Filed: Dec. 8, 1993

[30] Foreign Application Priority Data

| Dec. 8, 1992 | [JP] | Japan | 4-090381 U |
| Dec. 8, 1992 | [JP] | Japan | 4-090382 U |
| Jun. 25, 1993 | [JP] | Japan | 5-039720 U |
| Sep. 22, 1993 | [JP] | Japan | 5-056047 U |

[51] Int. Cl.6 .............................. G02C 1/02
[52] U.S. Cl. ........................ 351/110; 351/120; 351/128
[58] Field of Search .......... 351/65, 110, 111, 119, 351/120, 121, 124, 126, 128, 140; 2/453; 16/228

[56] References Cited

U.S. PATENT DOCUMENTS

| 816,838 | 5/1906 | Adt | 351/65 |
| 2,182,970 | 11/1937 | Nerney | 351/121 |
| 2,243,681 | 3/1941 | Pomeranz | 351/121 |
| 4,502,765 | 3/1985 | Cooper | 351/110 |
| 4,685,781 | 8/1987 | Wiedmann et al. | 351/110 |
| 4,744,646 | 5/1988 | Stewart | 351/121 |

*Primary Examiner*—William L. Sikes
*Assistant Examiner*—Huy Mai
*Attorney, Agent, or Firm*—Edwin E. Greigg; Ronald E. Greigg

[57] ABSTRACT

In rimless spectacles having a pair of lenses directly connected to each other by means of a bridge member, and a connecting member pivoted respectively to a forward end portion of a pair of temples, said connecting member being directly attached to the lenses. A flexible packing is interposed in a V-letter clearance formed between the lens and the connecting member. A bolt and a nut fix the lens, the packing and the connecting member in such a state that the amount of compression of the packing may be varied for controlling the opening of the temples.

34 Claims, 24 Drawing Sheets

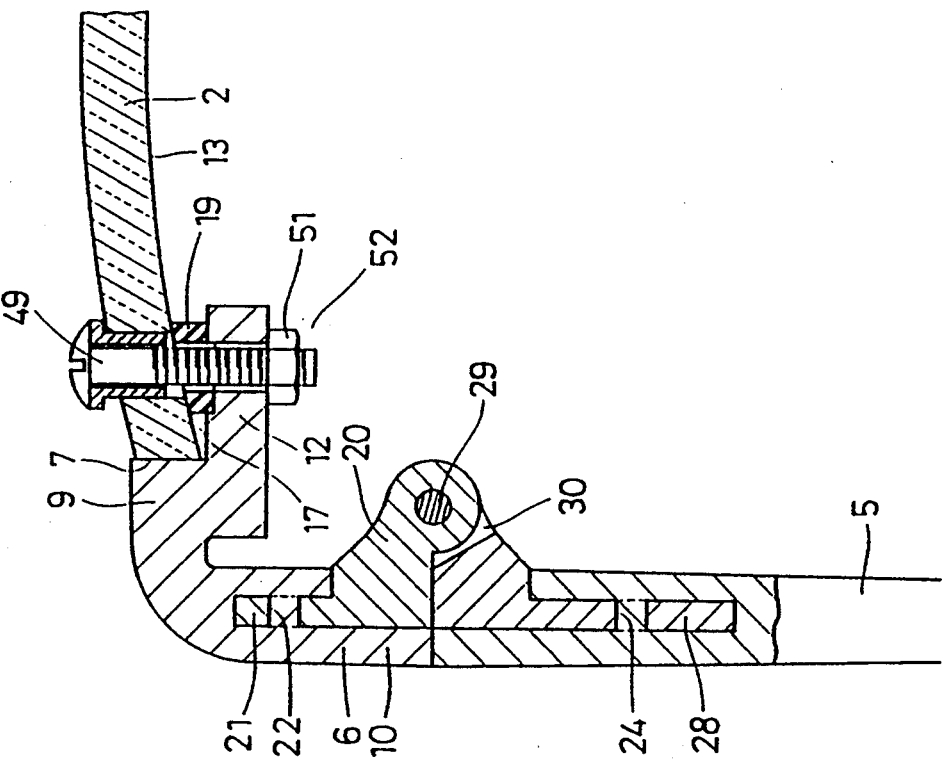
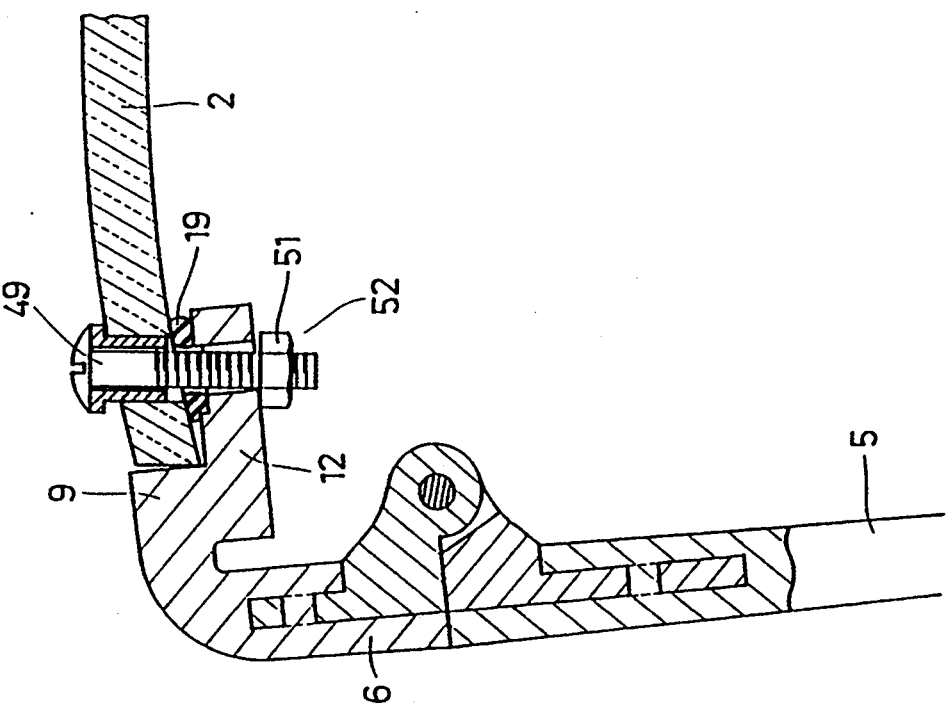

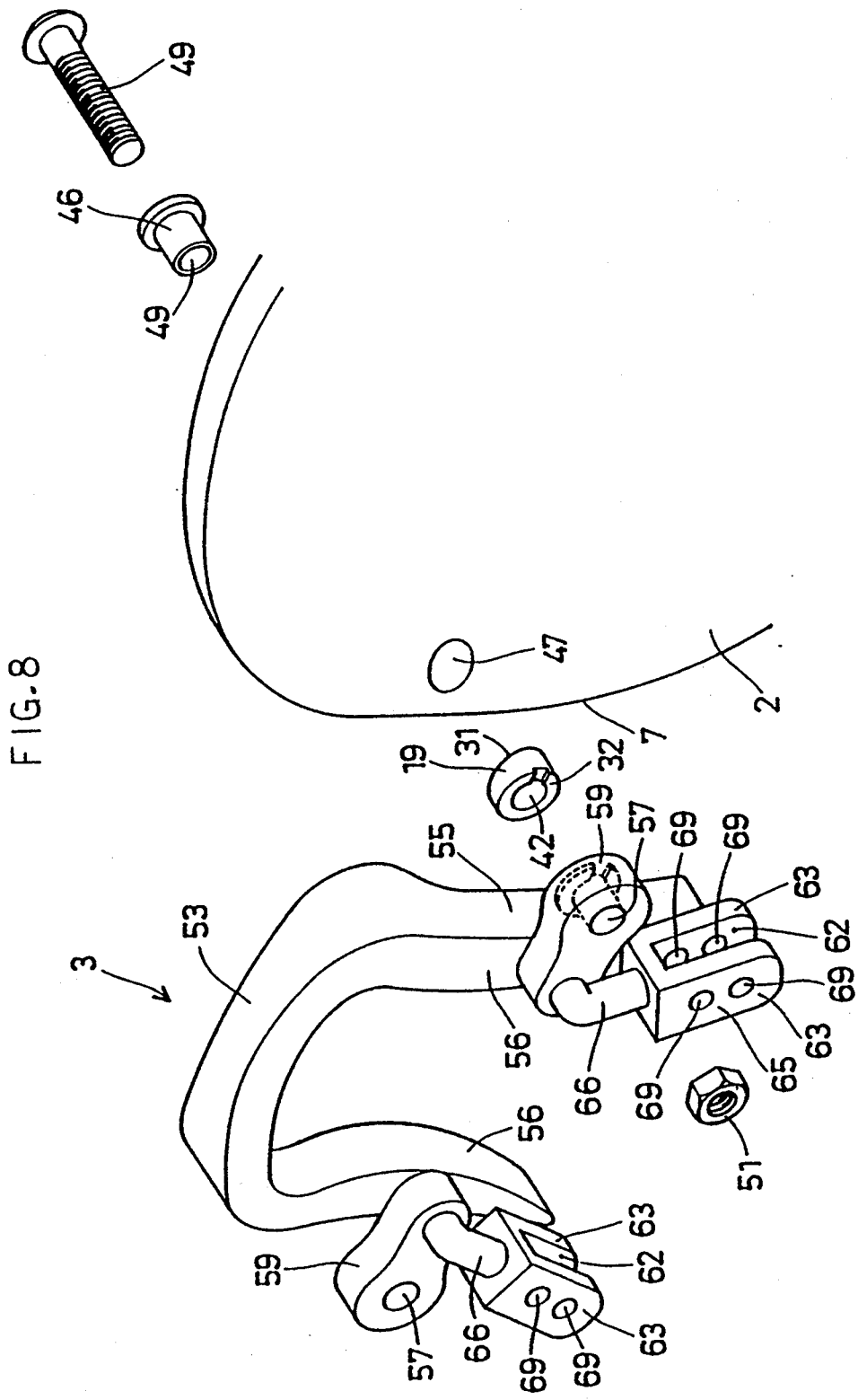

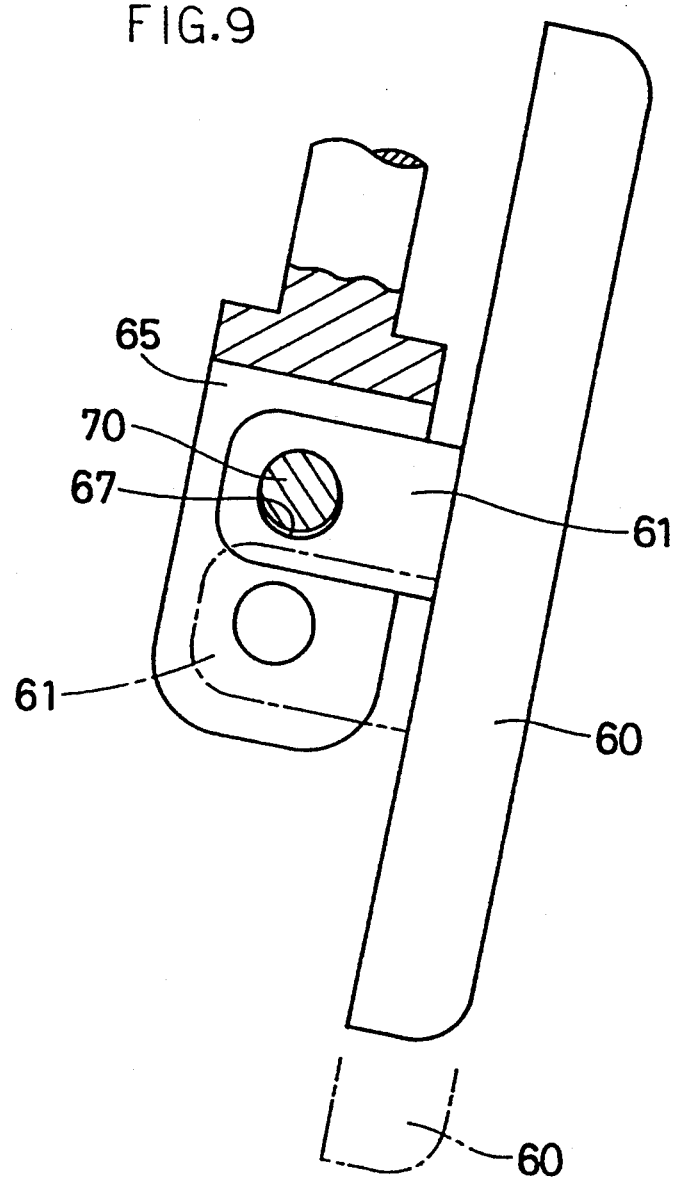

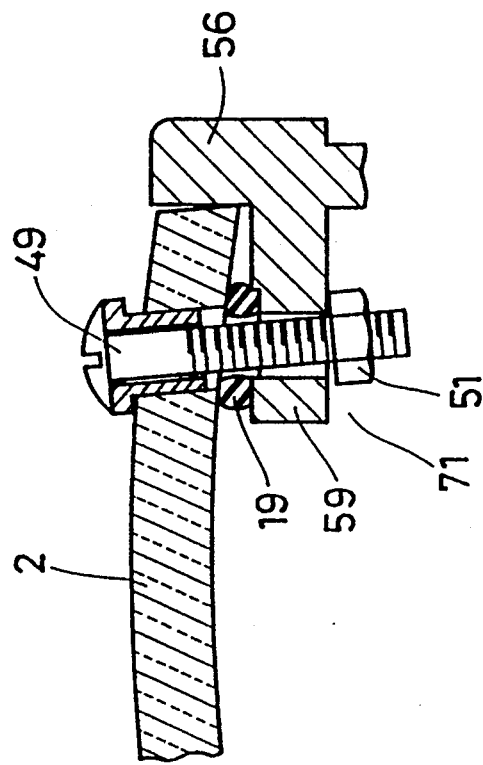
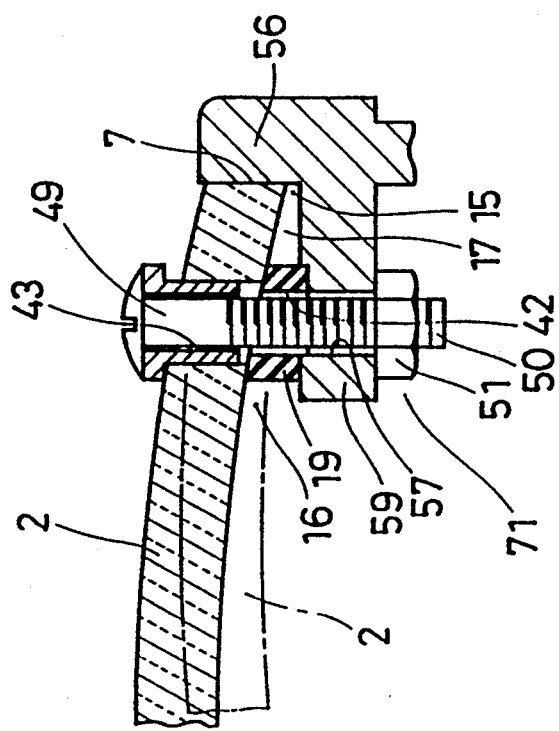

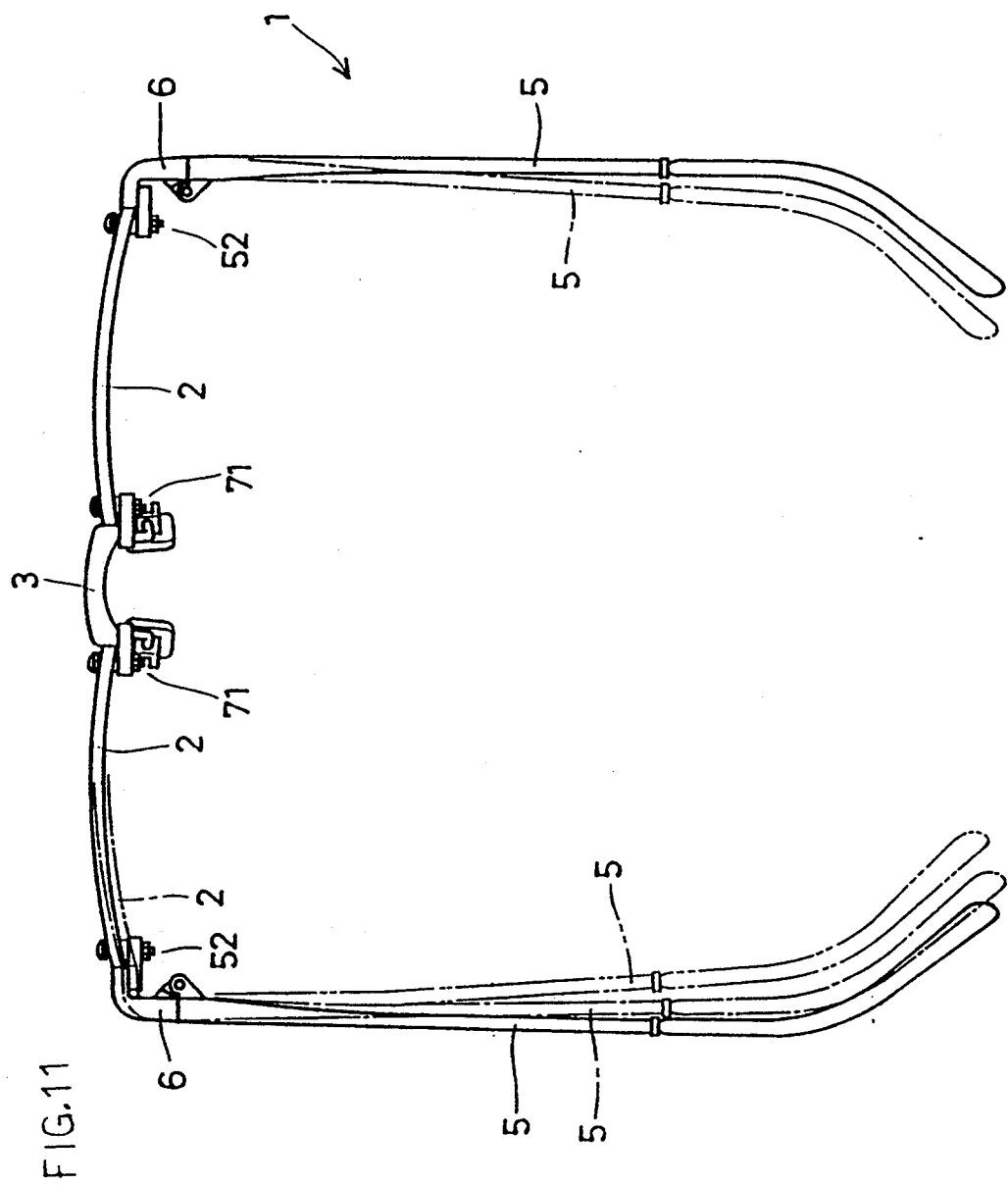

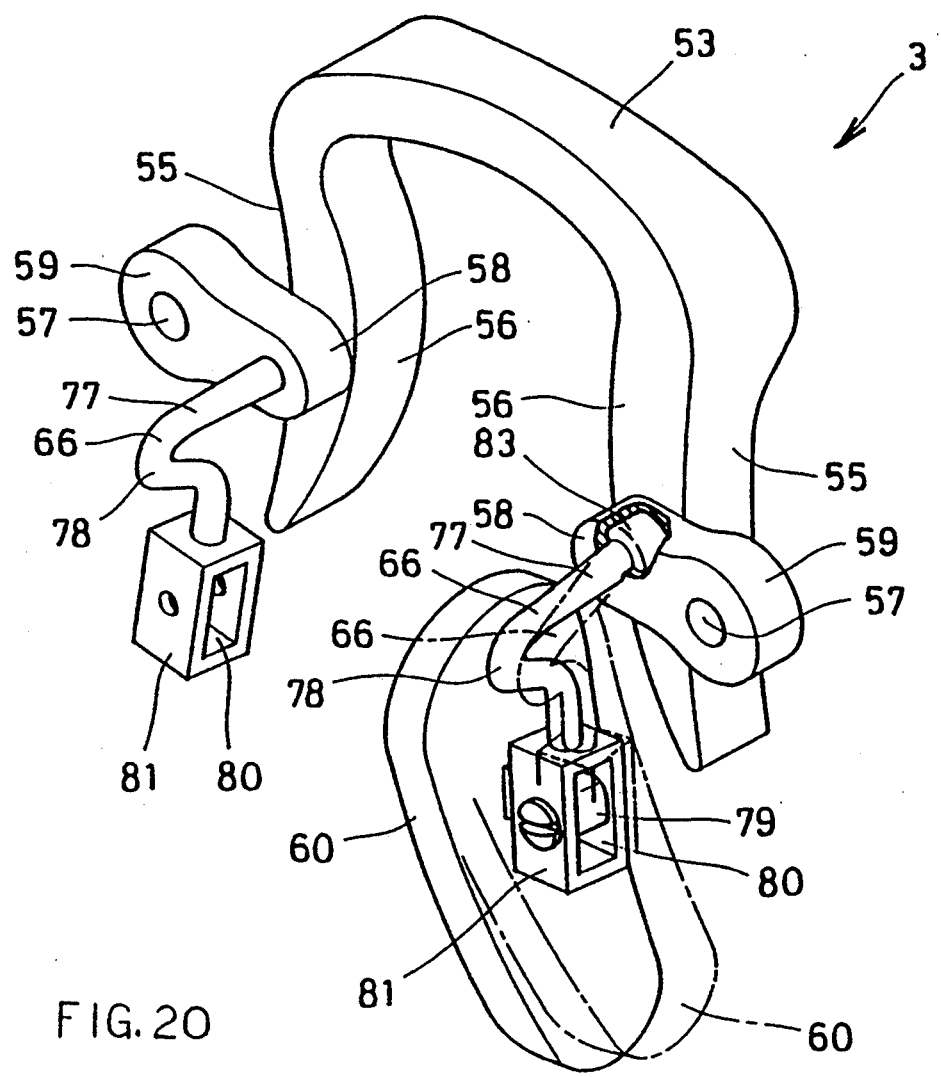
FIG. 20
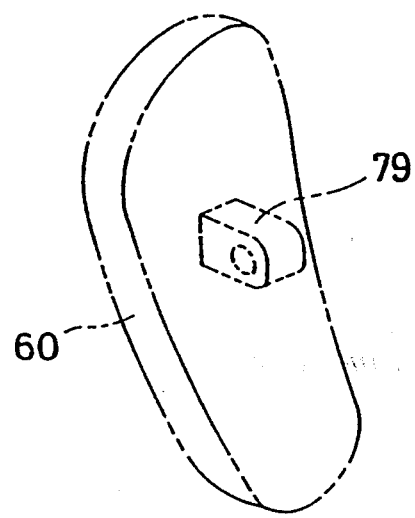

RIMLESS SPECTACLES WITH ADJUSTABLE TEMPLES AND LENSES

BACKGROUND OF THE INVENTION

1. Field of the Invention

The present invention relates to rimless spectacles which have a pair of lenses directly connected to each other by means of a bridge member at the inside portions of the lenses and a connecting member pivoted respectively to a forward end portion of a pair of temples, said connecting member being directly attached to the lenses.

2. Prior Art

Conventional rimless spectacles, as shown in FIG. 25, comprise a bridge member b which directly connects the inner side portion of each of lenses a and a, and a pair of temples c, each of which is pivotably connected to a connecting member d at a forward end thereof, said connecting member being directly attached to the outer portion of the lens a. Such rimless spectacles are so called two-point-spectacles and have an advantage of superior sight in side views and light weight since the rims of the lenses interfering the sight are completedly removed. Such rimless spectacles give a wearer such a feeling that the wearer is not wearing spectacles. Accordingly, the rimless spectacles becomes popular and its demand increases nowadays.

As the rimless spectacles, a number of types are proposed in view point of design and attaching construction of a connecting member to a lens and also attaching construction of a bridge member to the lens have not been changed. These will be decribed with reference to FIGS. 25 and 26.

Both side parts of FIG. 25 and the left side part of FIG. 26, show the attaching construction of a connecting member d to a lens a. The connecting member d is made of metal in the shape of a L-letter, and a contact-portion g is attached to the front portion of a main body e of the connecting member d by means of soldering, said contact-portion g being curved and contacted with a periphery f of the lens on the outer side of the lens. A fix-projection i is attached to the contact-portion g by means of soldering, said fix-portion being made to project inwardly of the lens and to have an end having an opening h. The outer and upper edge portion of the lens has an opening j, which has a common axis with the opening h of the fix-projection i. A bolt m is inserted into both of the openings h and j and resin washers k and k having even thickness, each washer being disposed at the both sides of the opening j of the outer side of the lens. A nut n is screwed on a screwed portion of the bolt which projects rearwardly of the lens, so as to fix the connecting member d to the lens a. In this attaching construction, the resin washers k and k are used for the purpose of buffer in order to prevent the lens from damaging due to the head of the bolt or the nut.

The center part of FIG. 25 and the right part of FIG. 26 are shown for describing the attaching construction of a bridge member b to the lens a. The attaching construction is basically the same as that of the connecting member d. A bolt m is inserted into an opening p of the fix-projection o and an opening q of the lens a, and also resin washers k and k having even thickness each washer being disposed at the both sides of the opening q of the inner side of the lens. A nut n is screwed on a screwed portion of the bolt which projects rearwardly of the lens, so as to fix the bridge member b to the lens a. The resin washers k and k are used also for the purpose of a buffer in order to prevent the lens from damaging due to the head of the bolt or the nut.

FIG. 27 shows another aspect of the attaching construction of the connecting member d to the lens a. The connecting member d, which is made of resin, presents an L-letter and has a contact-portion g and a fix-projection i at an end thereof. The outer and upper edge portion of the lens has an opening j, which has a common axis with the opening h of the fix-portion i. A rivet u is inserted into the opening h of the fix-projection, the opening j of the lens and a resin washer k, said washer being disposed at the opening j of the rear side of the periphery of the lens. The heads v and v of the rivet u are engaged with the front surface of the lens and the rear surface of the fix-projection so as to fix the connecting member d to the lens a.

The conventional rimless spectacles, however, had the following problems.

I. Where the connecting member was made of metal, it was necessary to use jigs such as a flat plier for varying the angle of bend of the connecting member to control the degree of opening of the temples in order to fit the rimless spectacles to the side head portions of a wearer. The operation for bending the connecting member had to be carried out after the connecting member was once removed from the lens in order to prevent the lens from damaging.

Therefore, to control the degree of opening of the temples, it was necessary to take steps of attaching the connecting member to the lens, assembling the spectacles, fitting the spectacles to the wearer, disassembling the connecting member to adjust the degree of bend where the spectacles did not fit, and then again attaching the connecting member to assemble the spectacles for checking fitness. Sometimes it was necessary to repeat these steps.

By the way, in the case of conventional metal frame speatacles having rims, the bending state of the connecting member could be controlled minutely in a state that the connecting member was attached to the lens. However, in the case of the rimless spectacles, which had to control the connecting member after removing the same from the lens, it was necessary to take a number of steps for controlling the connecting member, as mentioned above, and it was therefore inefficient in operation.

II. Further, where bend of the connecting member for adjustment was not suitable, attachment of the contact-portion and the periphery of the lens did not go well when the connecting member was attached to the lens, so that the lens might be sometimes broken. Thus, expensive lenses became useless and uneconomical.

III. Particularly, in the case of using the metal connecting member, the connecting member was assembled by means of soldering at plural portions thereof and therefore it was sometimes damaged and separated at the soldering portions when the connecting member was bent for adjustment.

IV. Where the connecting member of resin was fixed by means of a rivet, the connecting member itself could not be bent. Therefore, to fit the spectacles to a wearer, it was necessary to prepare a number of the connecting members having a different angle of bend. Thus, it had to design and prepare a plurality of molds and this increased manufacturing costs. Further, such a connecting member became peculier and so it was inconvenient in an ordinary store.

SUMMARY OF THE INVENTION

The present invention has an object to provide rimless spectacles which are superior in fitnees of the spectacles to a wearer and also in correction of eyesight and attempts to popularize the same.

To solve the above-mentioned problems, the present invention adopts the following means.

In rimless spectacles having a pair of lenses 2 directly connected to each other by means of a bridge member 3 at the inside portions of the lenses 2 and a connecting member 6 pivoted respectively to a forward end portion of a pair of temples 5, said connecting member 6 being directly attached to the lenses 2, said rimless spectacles characterized in that said each connecting member 6 has a contact-portion 9 with respect to the periphery 7 of the lens 2 and has a fix-projection 12 projecting inwardly of a concave side of the lens 2 in a state that the contact-portion 9 is contacted with the periphery 7 of the lens, said each connecting member 6 is constructed to form a V-letter clearance 17 between the fix-projection 12 and a concave surface 13 of the lens 2 to widen the clearance from the outer end to the inner end thereof, a flexible packing 19 is interposed in the V-letter clearance 17 and has a thickness which increases from the outer end to the inner end of the V-letter clearance 17 so as to fit a front surace 31 of the flexible packing 19 on the concave surface 13 of the lens 2 and a rear surface 32 thereof on the fix-projection 12 of the connecting member 6, a bolt 49 is inserted into each of openings 43, 42 and 11 of the lens 2, the flexible packing 19 and the fix-projection 12, and that a nut 51 is screwed on a screw portion of the bolt 49 which projects on the side of the fix-projection 12 or the lens 2, said nut being screwed to vary its tightening amount for controlling the amount of compression of the flexible packing 19. It is possible to provide a fix-projection 12 with the connecting member, said fix-projection 12 being made to project inwardly of the lens on the convex surface of the lens. In this case, the connecting member 6 is constructed to form a V-letter clearance 17 between the fix-projection 12 and a convex surface 72 of the lens 2 to widen the clearance from the outer end to the inner end thereof. A flexible packing 19 is interposed in the V-letter clearance 17 and has a thickness which increases from the inner end to the outer end of the V-letter clearance 17 so as to fit a front surace 31 of the flexible packing 19 on the fix-projection 12 of the connecting member 12 and a rear surface 32 thereof on the convex surface 72 of the lens 2. Further, a bolt 49 is inserted into each of openings 11, 42 and 49 of the fix-projection 12, the flexible packing 19 and the lens 2, and a nut 51 is screwed on a screw portion of the bolt 49 which projects on the side of the fix-projection 12 or the lens 2, said nut being screwed to vary its tightening amount for controlling the amount of compression of the flexible packing 19.

It is preferable to make at least the contact-portion 9 of the connecting member 6 resin.

It is possible to form such that the connecting member 6 is constructed to separate up and down to form two separate portions 75 and 76 at a forward portion thereof. Each of the separate portions 75 and 76 has a fix-projection 12 projecting inwardly of the lens 2 on the concave surface of the lens 2, and also the connecting member 6 is constructed to form a V-letter clearance 17 between the fix-projection 12 and a concave surface 13 of the lens 2 to widen the clearance from the outer end to the inner end thereof. A flexible packing 19 is interposed in the V-letter clearance 17 and has a thickness which increases from the outer end to the inner end of the V-letter clearance 17 so as to fit a front surace 31 of the flexible packing 19 on the concave surface 13 of the lens 2 and a rear surface 32 thereof on the fix-projection 12 of the connecting member 6. A bolt 49 is inserted into each of openings 43, 42 and 11 of the lens 2, the flexible packing 19 and the fix-projection 12, and a nut 51 is screwed on a screw portion of the bolt 49 which projects on the side of the fix-projection 12 or the lens 2, said nut being screwed to vary its tightening amount for controlling the amount of compression of the flexible packing 19.

Where the forward end of the connecting member 6 is separated up and down, it is possible to provide a fix-portion 12 which projects inwardly of the lens on the convex surface of the lens. In this case, The connecting member 6 is constructed to form a V-letter clearance 17 between the fix-projection 12 and a convex surface 72 of the lens 2 to widen the clearance from the outer end to the inner end thereof. A flexible packing 19 is interposed in the V-letter clearance 17 and has a thickness which increases from the inner end to the outer end of the V-letter clearance 17 so as to fit a front surface 31 of the flexible packing 19 on the fix-portion 12 of the connecting member 6 and a rear surface 32 thereof on the convex surface 72 of the lens 2. A bolt 49 is inserted into each of openings 11, 42 and 49 of the fix-projection 12, the flexible packing 19 and the lens 2, and a nut 51 is screwed on a screw portion of the bolt 49 which projects on the side of the fix-projection 12 or the lens 2, said nut being screwed to vary its tightening amount for controlling the amount of compression of the flexible packing 19.

The rimless spectacles according to the present invention is chracterized in an attaching construction of a bridge member.

The bridge member 3 has a contact-portion 56 at both of the ends thereof to fit a periphery 7 of the lens 2 respectively, and has a fix-projection 59 projecting inwardly of the lens 2 on a concave suraface of the lens 2 in a state that the contact-portion 56 is contacted with the periphery 7 of the lens 2. The bridge member 3 is constructed to form a V-letter clearance 17 between the fix-projection 59 and a concave surface 13 of the lens 2 to widen the clearance from the outer end to the inner end thereof. A flexible packing 19 is interposed in the V-letter clearance 17 and has a thickness which increases from the outer end to the inner end of the V-letter clearance 17 so as to fit a front surace 31 of the flexible packing 19 on the concave surface 13 of the lens 2 and a rear surface 32 thereof on the fix-projection 59 of the bridge member 3. A bolt 49 is inserted into each of openings 43, 42 and 57 of the lens 2, the flexible packing 19 and the fix-projection 59, and a nut 51 is screwed on a screw portion of the bolt 49 which projects on the side of the fix-projection 59 or the lens 2, said nut being screwed to vary its tightening amount for controlling the amount of compression of the flexible packing 19.

It is possible to provide a fix-projection 59 with the bridge member, said fix-projection 59 being made to project inwardly of the lens on the convex surface of the lens. In this case, the bridge member 3 is constructed to form a V-letter clearance 17 between the fix-projection 59 and a convex surface 72 of the lens 2 to widen the clearance from the inner end to the outer end thereof. A flexible packing 19 is interposed in the V-letter clearance 17 and has a thickness which increases from the inner end to the outer end of the V-letter clearance 17 so as to fit a front surface 31 of the flexible packing 19 on the fix-projection 59 of the bridge member 3 and a rear surface 32 thereof on the convex surface 72 of the lens 2. A bolt 49 is inserted into each of openings 57, 42 and 43 of the fix-projection 59, the flexible packing 19 and the lens 2, and a nut 51 is screwed on a screw portion of the bolt 49 which projects on the side of the fix-projection 59 or the lens 2, said nut being screwed to vary its tightening amount for controlling the amount of compression of the flexible packing 19.

In the rimless spectacles, it is preferable to make at least the contact-portion 56 of the bridge member 3 resin.

Where the rimless spectacles according to the present invention is also characterized in an attaching construction of the bridge member, it is preferable to construct the bridge member as follows:

The bridge member 3 has a gate portion made of hard resin or flexible and relatively hard resin, which gate portion comprises contact-portions 56 and 56 at both ends of a level connecting portion 53, said each contact-portions 56 and 56 having contact surface 55 for the periphery 7 of the lens 2. A connecting arm 66 is made to project from each of the contact-portions 56 and 56 to provide a pad 60 at the forward end thereof, said connecting arm 66 being preferably made of springy materials.

It is preferable that the connecting arm 66 provides a U-letter portion 78 in the middle portion thereof. In this case, one of the aspects of the connecting member may be constructed such that to form a U-letter the connecting arm 66 is turned forwardly and downwardly from a level projection 77 of the connecting arm 66 which extends rearwardly and horizontally. Further, it is preferable to make the connecting arm 66 relatively soft resin having flexibility.

In this case, the connecting arm 66 is preferably formed to be thick at a base end thereof which is adjacent to the contact-portion 56 of the bridge. Further, the connecting arm 66 may be made of metal having high flexibility or a coil spring. Furthermore, it is preferable that the connecting arm 66 provides an anchor 83 at a base end thereof, which is adjacent to the contact-portion 56 of the bridge, said anchor 83 being embedded in the contact-portion 56.

In the rimless spectacles, it is preferable that the contact portion of the flexible packing 9 for the fix-projection 12 or 59 has a first engaging portion which is formed to be convex or concave, and the contact portion of the fix-projection 12 or 59 has a second engaging portion which engages with the first engaging portion, so as to prevent relative rotation of the flexible packing 9 and the bolt. It is preferable to construct the rimless spectacles of the present invention such that the characteristics of the connecting member are provided with the characteristics of the bridge member in combination.

The rimless spectacles of the present invention have the following functions.

Since the thickness of the packing increases from the outer end to the inner end thereof or from the inner end to the outer end thereof, the thick portion of the packing may be compressed flexibly and deformed greater than the other portion when the nut is tightened.

Accordingly, as the amount of compression of the packing 19 increases by increasing the amount of tightening the nut 51 at the attaching portion 52 of the connecting member, the temples 5 which are in the state of open, may be tilted inwardly about the attaching portion 52. For example, the temples 5 may be tilted inwardly from the state of FIG. 7A to the state of FIG. 78. The state of FIG. 7A is the same as that which is shown with a solid line in the right hand part of FIG. 11, and FIG. 7B is the same as that which is shown with a phantom line in the right hand part of FIG. 11.

Further, as the amount of compression of the packing 19 increases by increasing the amount of tightening the nut 51 at the attaching portion 71 of the bridge member, the lens 2 may be tilted rearwardly about the attaching portion 71. According to the amount of compression of the packing, the lens 2 may, for example, be tilted rearwardly from the state which is shown with a solid line in FIG. 10A to the state of FIG. 10B. As the result, the temples 5 in the open state may be tilted inwardly about the attaching portion 71. For example, it may be tilted from the state, which is shown with a solid line in the left hand part of FIG. 11, to the state which is shown with a phantom line. In addition, as the amount of compression of the packing 19 increases by increasing the amount of tightening the nut at the attaching portion 52 of the connecting member, the temples 5 may be further tilted inwardly from the state of FIG. 11 in the left hand part, as shown with a phantom line, to the state which is shown with a two dot chain line.

Where the contact portions 9 and 56 are made of resin, the periphery of the lens is gently contacted therewith.

According to the present invention, the rimless spectacles may easily fit the wearer by controlling the amount of compression of the packing at the attaching portion of the connecting member or the attaching portion of the bridge member.

Particularly, where the gate portion of the bridge member is made of hard resin or relatively hard resin having flexibility and the connecting arm is made of springy materials, the following specific functions may be obtained.

Namely, it is difficult to deform the gate portion, which is made of hard resin or relatively hard resin having flexibility, when wearing the rimless spectacles. Therefore, relative positions of the right and left lenses cannot be changed easily. Further, the connecting arm, which is made of springy materials, may smoothly fit the pad to the bridge of the nose by utilizing flexible deformation of twist. Specifically, where the connecting arm has the U-letter portion, its flexible deformation may be smoothly obtained.

Advantages of the present invention are as follows:

I. It is easy to control the maximum opening of the temple minutely according to a wearer by adjusting the amount of compression of the packing at the attaching portion of the connecting member or the attaching portion of the bridge member.

Therefore, contrary to the case of bending the connecting member in the prior art, it becomes possible to adjust minutely in the state that the connecting member is attached to the lens, and accordingly the adjusting operation does not take time, but surely carry out the minute adjustment of the temples. Further, it becomes possible to solve such a problem of breaking the lenses in the prior art, which is caused by unsuitable bend of the connecting member for adjustment of fitnees. As the result, it may prevent expensive lenses from damaging, but it becomes economical. Further, where the connecting member is made of metal parts which are integral with each other by soldering, it is almost not necessary to bend the same, and it is not afraid that the soldering portions of the connecting member are separated. Where the connecting member is made of resin, there is no need to design and prepare a number of sizes of the connecting member for only fitting the same to a wearer as is done in the prior art, but one type of the connecting member may satisfy any requirement for a number of wearers, since the maximum opening state of the temples may be controlled by compressing the packing.

II. Where the opening state of the temples may be varied by both of the attaching portions of the connecting member and the bridge member, the range of regulation becomes wide so that adjustment of the rimless spectacles may be carried out more appropriately.

III. Particularly, where the contact portion is made of resin, it contacts with the periphery of the lens gently. Therefore, it is not afraid that the lenses are broken even if there is a difference in size in forming an opening with the lenses, since the soft contact of the contact portion made of resin absorbs the difference in size.

Thus, the present invention has achieved easy and minute adjustment of the rimless spectacles and therefore further progresses popularization of the rimless spectacles to respond to its increased demand.

IV. Further, since the gate portion of the bridge member is made of hard resin or relatively hard resin having flexibility, it is difficult that relative positions of the right and left lenses are easily changed when wearing the rimless spectacles. This is important in correction of eyesight. Furthermore, by making the connecting arms with springy materials, it becomes possible to suitably fit the pads to the bridge of the nose, since the connecting arms may be opened outwardly due to flexible deformation.

Thus, the rimless spectacles becomes suitable in correction of eyesight and fitness to the wearer by constructing the bridge member with different materials.

Other objects and advantages will be apparent from the following description of the embodiments with reference to the drawings.

BRIEF DESCRIPTION OF THE DRAWINGS

FIGS. 7A and 7B are sectional views showing function of tilt of the temple due to compression of the packing at the attaching portion of the connectiong member, FIG. 8 is a perspective view of disassembled parts showing attaching construction of a bridge member to the lens, FIG. 9 is a descriptive view showing a manner of attaching a pad to the bridge member, FIGS. 10A and 10B are sectional views showing function due to compression of the packing at the attaching portion of the bridge member, FIG. 11 is a plan view showing a state of tilt of the temple inwardly due to compression of the packing, FIG. 20 is a perspective view showing another example of the bridge member.

DETAILED DESCRIPTION OF THE EMBODIMENTS

First Embodiment

Figure 1:
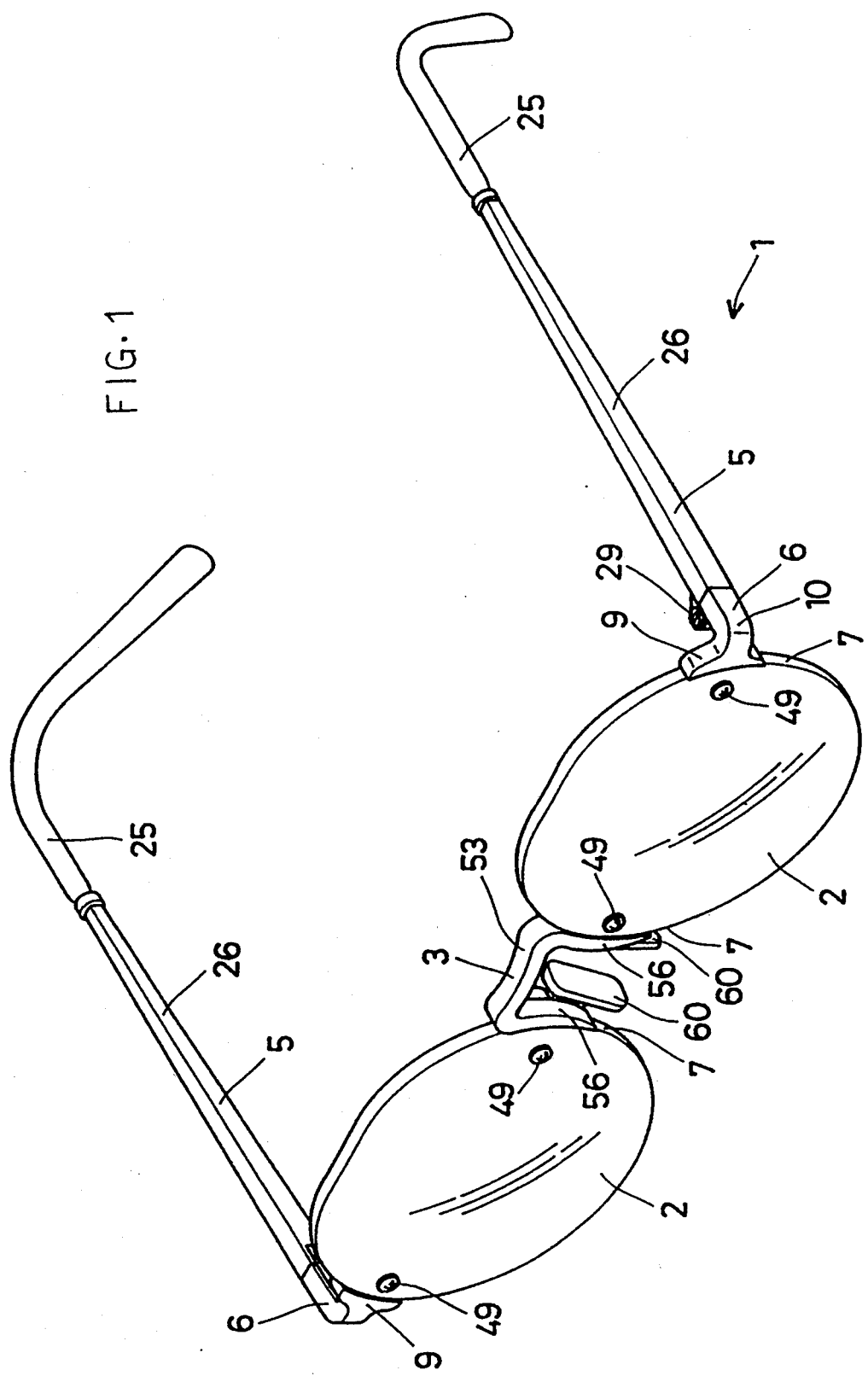
FIG. 1 is a perspective view of the rimless spectacles of an embodiment of the present invention.

In FIG. 1, rimless spectacles 1 according to the present invention comprise a pair of lenses 2 and 2 and a bridge member 3 for connecting the inner side portions of the lenses together, a pair of temples 5, and a connecting member 6 which is pivotally connected to the forward end of each of the temples 5, said connecting member 6 being attached to the outer side portion of the lens 2.

Figure 2:
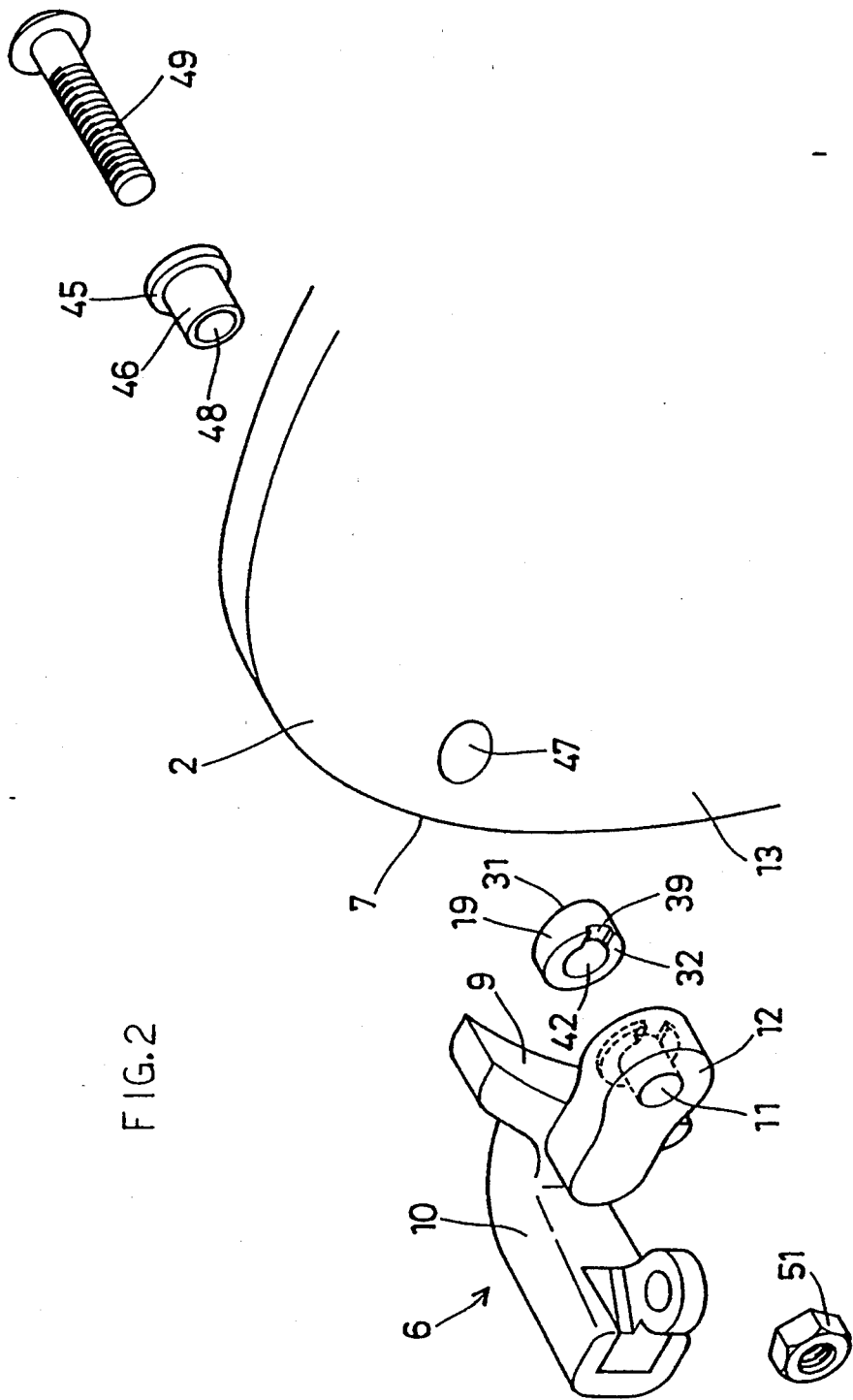
FIG. 2 is a perspective view of disassembled parts showing attaching construction of a connecting member to a lens.
Figure 3:
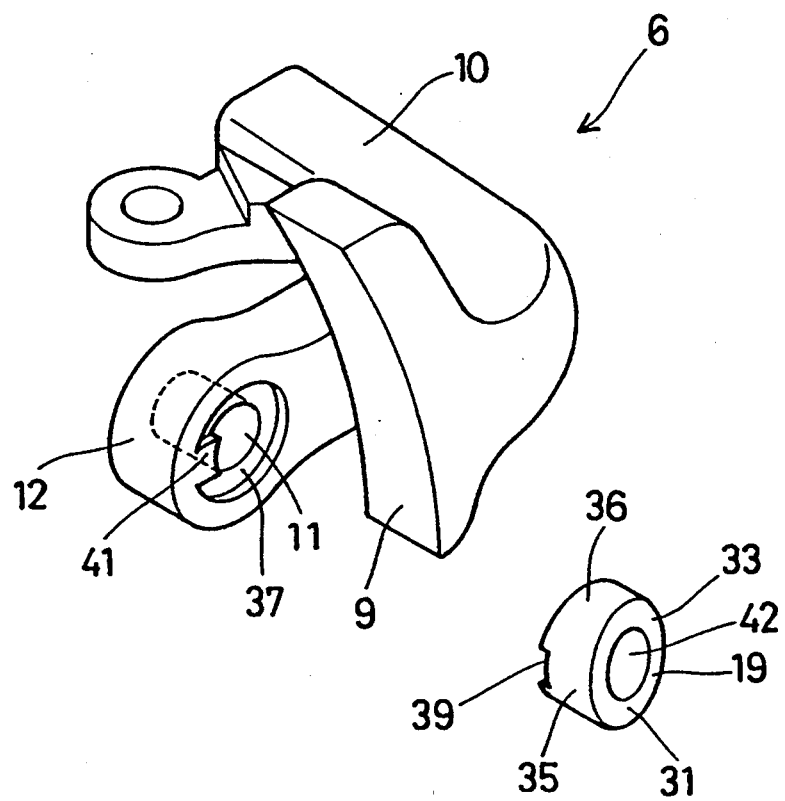
FIG. 3 is a perspective view showing the connecting member together with a packing.
Figure 4:
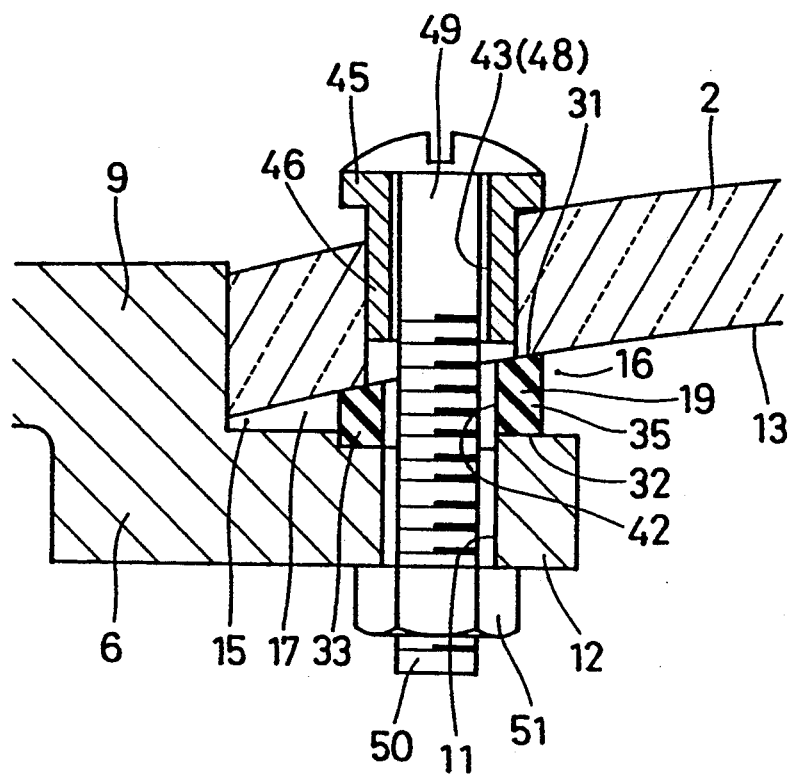
FIG. 4 is a sectional view showing attaching construction of the connecting member to the lens.

As shown in FIGS. 1 through 3, the whole connecting member 6 is integrally made of plastics such as nylon to form an L-letter. The connecting member 6 has a contact portion 9 at a forward portion of a main body 10 thereof and the contact portion 9 is curved to contact with a periphery 7 of the lens. A fix-projection 12 is provided at the central portion of the reverse side of the contact portion 9 to project inwardly of the lens and the fix-projection 12 has an opening 11 at the forward end thereof. The fix-projection 12 is positioned on the concave surface of the lens. In the state that the contact portion 9 is in contact with the periphery 7 of the lens, the connecting member 6 is constructed to form a V-letter clearance 17 between the fix-projection 12 and a concave surface 13 of the lens 2 to widen the clearance from the outer end to the inner end thereof, as shown in FIG. 4. A flexible packing 19 is interposed in the V-letter clearance 17.

Figure 5:
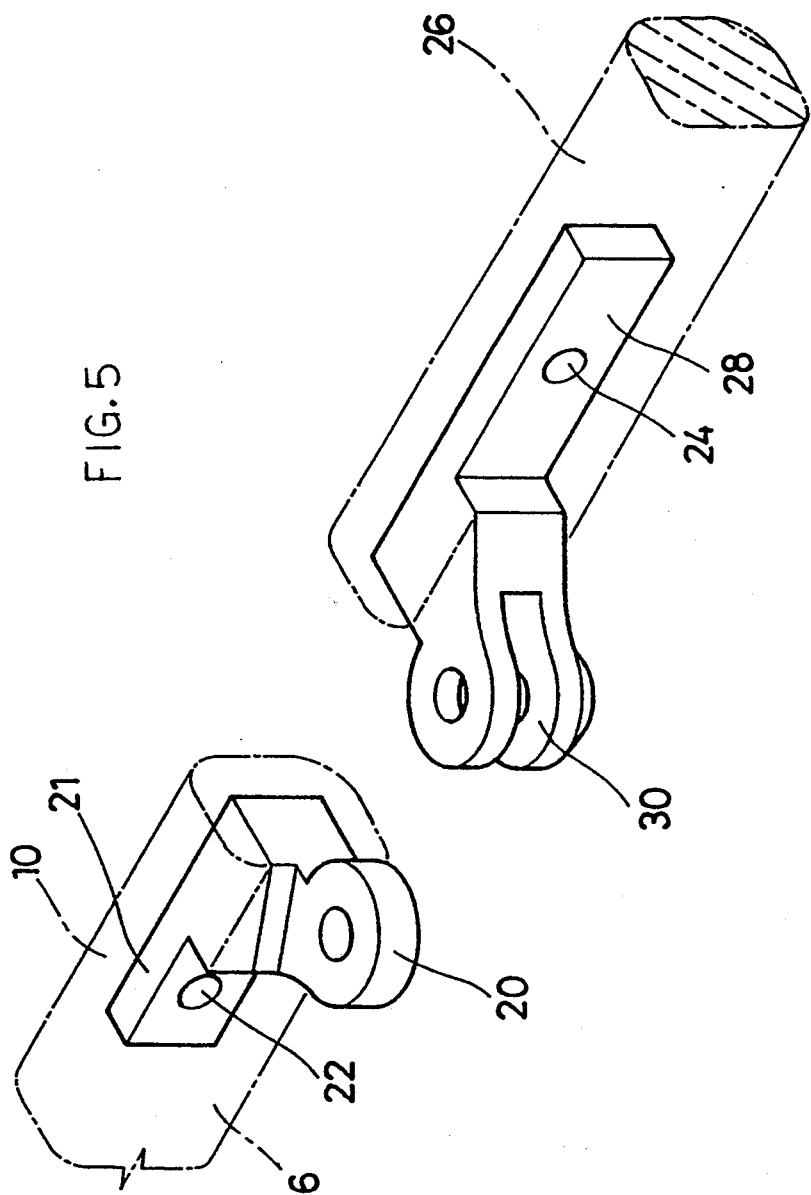
FIG. 5 is a perspective view showing the rear end of the connecting member and a hinge member provided with a forward end of a temple.

As shown in FIGS. 5 and 7A, a fix member 21, which is provided with the base portion of a hinge member 20, is embedded in the main body 10 in such a state that the hinge member 20 projects towards the inside of the rear portion of the main body 10. The resin of the main body is integral through a fix-opening 22 of the fix member 21, so that the hinge member 20 is firmly secured to the connecting member 6 via the embedded fix member 21.

Figure 6:
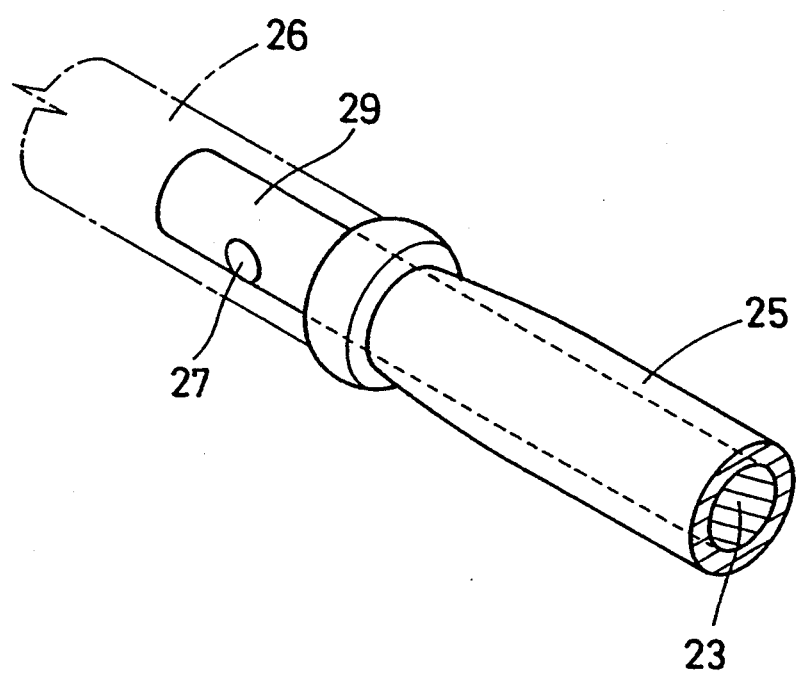
FIG. 6 is a perspective view showing a connecting manner of a front temple and a rear temple.

As shown in FIGS. 1, 5 and 6, the temple 5 comprises a rear temple 25 having a metal core 23, and a front temple 26 of resin which is connected to the rear temple 25. The connection of the front and rear temples is made such that a projection 29 of the metal core having a fix-opening 27 is embedded in the rear portion of the front temple 26 and the resin of the front temple 26 holds the metal core of the rear temple 25 via the fix-opening 27. As shown in FIG. 5, a fix member 28 having a fix-opening 24 is embedded in the forward portion of the front temple 26, and a hinge member 30 is attached to the fix member 28 in such a state the the hinge member projects towards the inside of the front portion of the front temple 26, in the same manner as the connecting member. The connecting member 6 may be tilted at the forward end of the temple 5 by means of pivotal connection 29 of the hinge member 30 to the hinge member 20, as shown in FIGS. 1 and 7A.

As shown in FIGS. 2 through 4, the packing 19 is formed to be cylindrical by using such as urethane, and thickness of the packing becomes greater from an outer end to an inner end thereof, so that a front surface 31 may be in contact with the concave surface 13 of the lens 2 and a rear surface 32 may be in contact with the fix projection 12. A rear end portion 36 of the packing 19 is formed to be engaged with a circular concave 37 which is formed with the front surface of the fix projection 12. In such a state that the rear end portion 36 and the circular concave 37 are engaged each other, a circular engaging concave 39, which is, for example, provided at the inner side of the periphery of the rear end portion, may be engaged with a circular engaging convex 41 which is provided at the inner side of the periphery of the circular concave 37, so that relative rotation of the packing can be prevented. The packing 19 is provided with an opening 42 which is coaxial with the opening 11 of the fix-projection 12.

The outer and upper portion of the lens 2 has an opening 43 which has a common axis as that of the opening 11 of the fix-projection 12 which projects inwardly of the lens in a state that the contact portion 9 is in contact with the periphery 7 of the lens. In this embodiment, the opening 43 is formed to be an opening 48 of a tube 46, which opening 48 is formed by inserting the tube 46 into an opening 47 of the lens which is coaxial with the opening 11 of the fix-projection 12.

As shown in FIG. 4, the flexible packing 19 is interposed in the V-letter clearance 17 while the engaging concave 39 and the engaging convex 41 are engaged each other. From the side of the lens A bolt 49 is inserted into the opening 43 of the lens 2, the opening 42 of the packing 19 and the opening 11 of the fix-projection 12, which have the common axis. A nut 51 is screwed onto a screwed portion 50 of the bolt, which projects on the side of the fix-projection 12. The amount of compression of the packing 19 may be varied by controlling the degree of tightening the nut 51. Since thickness of the packing 19 increases from the outer end to the inner end thereof, the thick portion of the packing is compressed flexibly and deformed greater than the other when the nut is screwed and tightened.

Accordingly, as the amount of compression of the packing 19 increases by increasing the amount of tightening the nut 51 at the attach portion 52 of the connecting member, the temple 5 which is in the state of open, may be tilted inwardly about the attaching portion 52. For example, the temple 5 may be tilted inwardly from the state of FIG. 7A to the state of FIG. 7B. The state of FIG. 7A is the same as that which is shown with a solid line in the right hand part of FIG. 11, and FIG. 7B is the same as that which is shown with a phantom line in in the right hand partion of FIG. 11.

The bridge member 3 is formed integrally by using resin and as shown in FIGS. 1 and 8, the bridge member 3 has a level connecting portion 53, with both ends of which contact portions 56 and 56, each having a contact surface 55 for the periphery 7 of the lens, are formed integrally to present a gate shape. A fix-projection 59, which has an opening 57 at the forward end thereof, is provided respectively at the central portion of the rear surface of the contact portions 56 and 56 to project inwardly of the lens. The fix-projection 59 is arranged on the concave surface of the lens. Each of the contact potions 56 and 56 is connected to a box 65 via a connecting arm 66 in the shape of an L-letter, and the box is provided with supporting members 63 and 63 which are faced to each other. The supporting members form a space 62 which is long up and down for freely engaging a connecting projection 61 of a pad 61, which is shown in FIG. 9. Fix openings 69 and 69 are formed with the supporting members 63 and 63 of the box 66 in plural steps in up and down, for example, two steps or stories. The fix openings have the common axis of an opening 67 of the connecting projection 61.

In the bridge member 3, it is preferable to form its gate portion integrally by using relatively hard resin having flexibility. Further it is preferable to form integrally by using relatively soft resin having flexibility.

By the way, the gate portion may be made by using for example polyether sulfone resin. Further, for the connecting arm, it may use, for example, a Radel-R of AMOCO in the U.S., which comprises polyphenyl-sulfone resin.

After the engaging openings, which locate at suitable hight for a wearer, are selected, as shown in FIG. 9, a pivot shaft 70, such as a bolt, which is held in the right and left openings, is inserted into the opening 67 of the connecting projection 61 and then the pad 60 is attached to the box 65 rotatably.

In the state that the contact portion 56 is in contact with the periphery 7 of the lens, a V-letter clearance 17 is formed between the fix-projection 59 and the concave surface 13 of the lens 2 to widen the clearance from the outer end 15 to the inner end 16 thereof, as shown in FIG. 10A. The flexible packing 19 is interposed in the V-letter clearance 17, in the same manner as mentioned hereinbefore. From the side of the lens, the bolt 49 is inserted into the openings 43, 42 and 57 of the lens, the pad 19 and the fix-projection 59, which openings are coaxial with one another.

The nut 51 is screwed onto the screwed portion 50 of the bolt 49, which projects on the side of the fix-projection 59.

Accordingly, as the amount of compression of the packing 19 increases by increasing the amount of tightening the nut 51, the lens 2 may be tilted rearwardly about the attaching portion 71 of the bridge member 3. According to the amount of compression of the packing 19, the lens 2 may, for example, be tilted rearwardly from the state which is shown with a solid line in FIG. 10A, to the state of FIG. 10B. As the result, the temples 5 in the state of open may be tilted inwardly about the attaching portion 71. For example, it may be tilted from the state, which is shown with a solid line in the left hand part of FIG. 11, to the state which is shown with a phantom line. In addition, as the amount of compression of the packing 19 increases by increasing the amount of tightening the nut 51 at the attach portion 52 of the connecting member, the temple 5 may be further tilted inwardly from the state of FIG. 11 in the left hand part, as shown with a phantom line, to the state which is shown with a two dot chain line.

Second Embodiment

Figure 12:
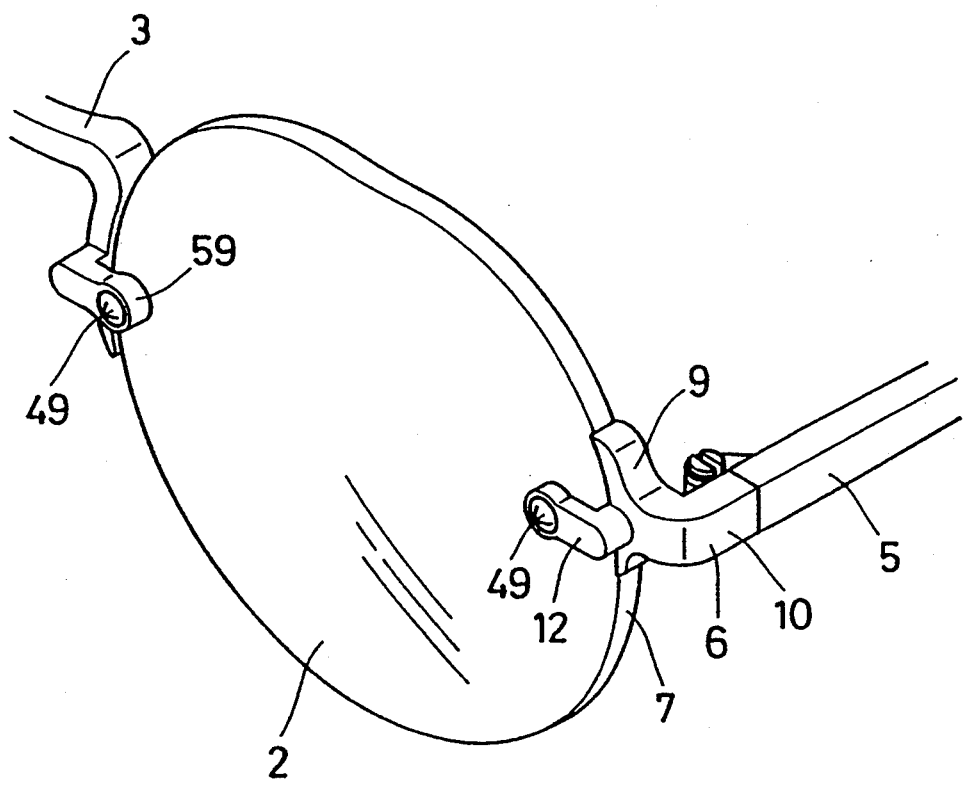
FIG. 12 is a perspective view showing another embodiment of the present invention
Figure 13:
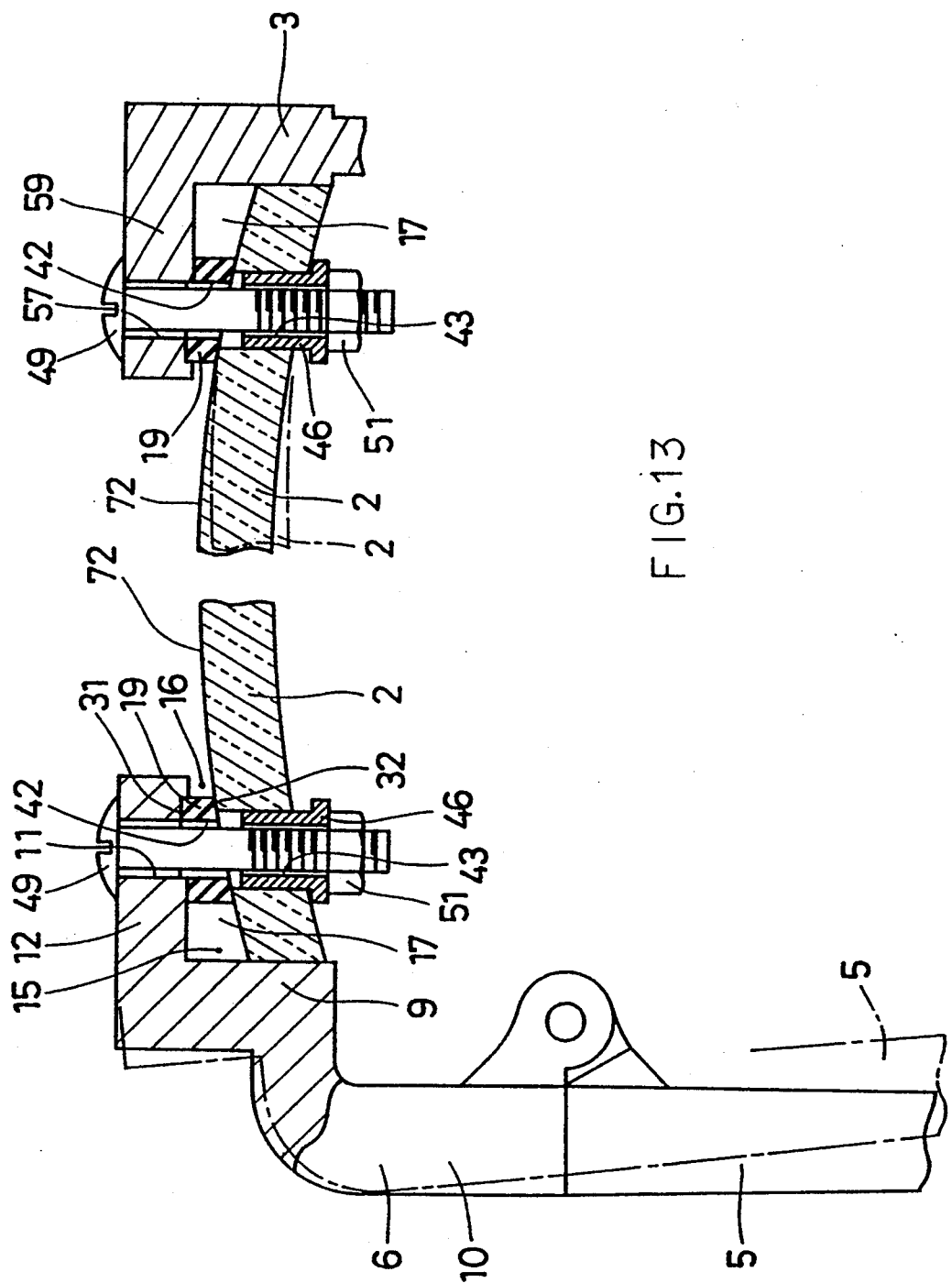
FIG. 13 is a descriptive view showing attaching construction of the connecting member and the bridge member in the case that the fix-projection is arranged on the side of the convex surface of the lens.

FIGS. 12 and 13 show another embodiment of the rimless spectacles according to the present invention.

A connecting member 6 is pivotally connected to the forward end of a temple 5, and the whole connecting member 6 is integrally made of plastics to form an L-letter. The connecting member 6 has a contact portion 9 at an forward portion of a main body 10 thereof and the contact portion 9 is curved to contact with a periphery 7 of a lens 2. A fix-projection 12 is provided at the central portion of the front side of the contact portion 9 to project inwardly of the lens 2 and the fix-projection 12 has an opening 11 at the forward end thereof. The fix-projection 12 is positioned on the convex surface of the lens 2.

In the state that the contact portion 9 is in contact with the periphery 7 of the lens 2, the connecting member 6 is constructed to form a V-letter clearance 17 between the fix-projection 12 and the convex surface 72 of the lens 2 to widen the clearance from the inner end to the outer end thereof, as shown in FIG. 13. A flexible packing 19 of resin having flexibility, is interposed in the V-letter clearance 17. The flexible packing 19 gradually increases its thickness from the inner end to the outer end thereof so that a front surface 31 of the packing contacts with the fix-projection 12 and a rear surface of the packing contacts with the convex surface 72 of the lens 2.

Figure 14:
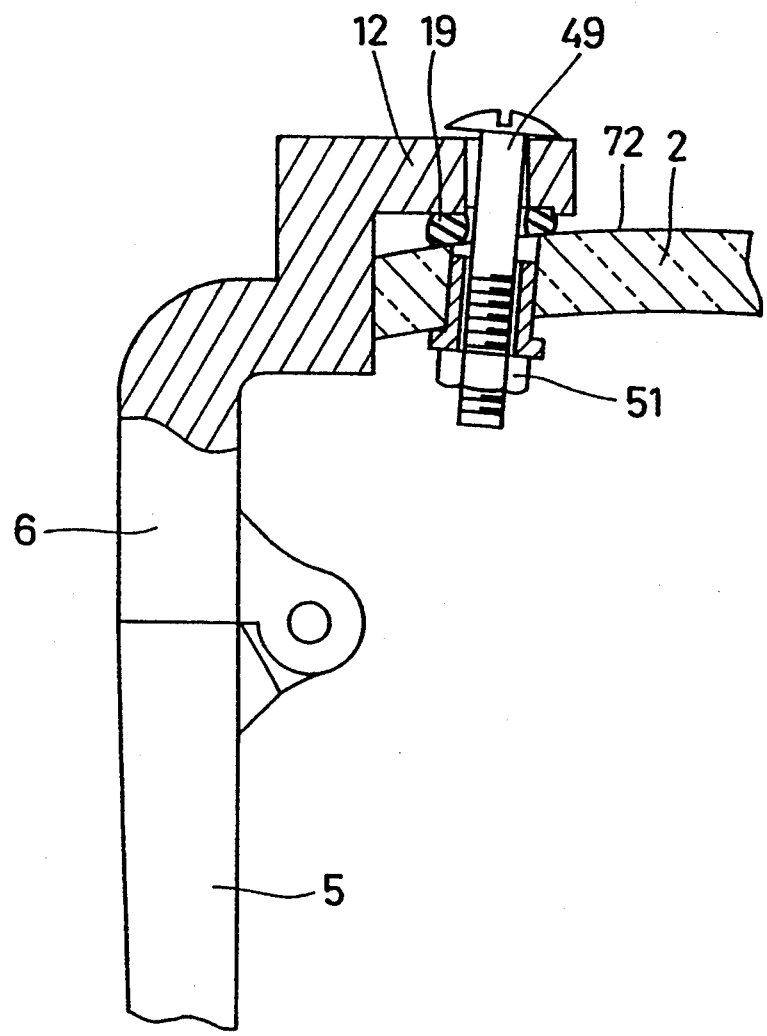
FIG. 14 is a sectional view showing function of tilt of the temple due to compression of the packing in the attaching construction of the connecting member in the case that the fix-projection is arranged on the side of the convex surface of the lens.

From the side of the fix-projection 12, a bolt 49 is inserted into the openings 11, 42 and 43 of the fix-projection 12, the packing 19 and the lens 2, which openings are coaxial with one another. A nut 51 is screwed onto a screwed portion of the bolt 49 which projects on the side of the lens and the amount of compression of the packing 19 may be varied by controlling the amount of tightening the nut 51. Namely, the opening state of the temple 5 can be varied, as mentioned hereinbefore. The state shown with a phantom line in the left part of FIGS. 13 and 14, means that the temple 5 is tilted inwardly due to compression of the packing 19.

The bridge member 3 for connecting the inner side portions of the lenses 2, is formed integrally by using resin, and contrary to the first embodiment, the fix-projection 59 projects on the convex surface of the lens. Between the fix-projection 59 and the convex surface 72 of the lens, the V-letter clearance 17 is formed, in the same manner as that of the first embodiment, and the packing 19 having flexibility is interposed in the V-letter clearance 17.

Figure 15:
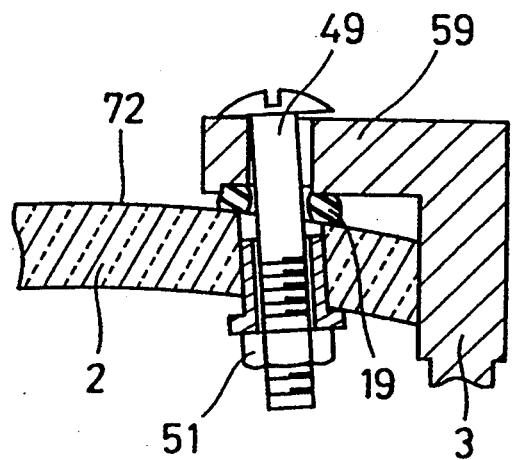
FIG. 15 is a sectional view showing compressing function of the packing in the case that the fix-projection of the bridge member is arranged on the side of the convex surface of the lens.

From the side of the fix-projection 12, a bolt 49 is inserted into the openings 57, 42 and 43 of the fix-projection 59, the packing 19 and the lens 2, which openings are coaxial with one another. A nut 51 is screwed onto a screwed portion of the bolt 49 which projects on the side of the lens and the amount of compression of the packing 19 may be varied by controlling the amount of tightening the nut 51. Namely, the opening state of the temple 5 can be varied. As shown with a phantom line in FIGS. 15 and 13, the lens 2 may be tilted rearwardly with compression of the packing, so that the temple 5 can be tilted inwardly as shown with a phantom line in the left part of FIG. 11.

Third Embodiment

Figure 17:
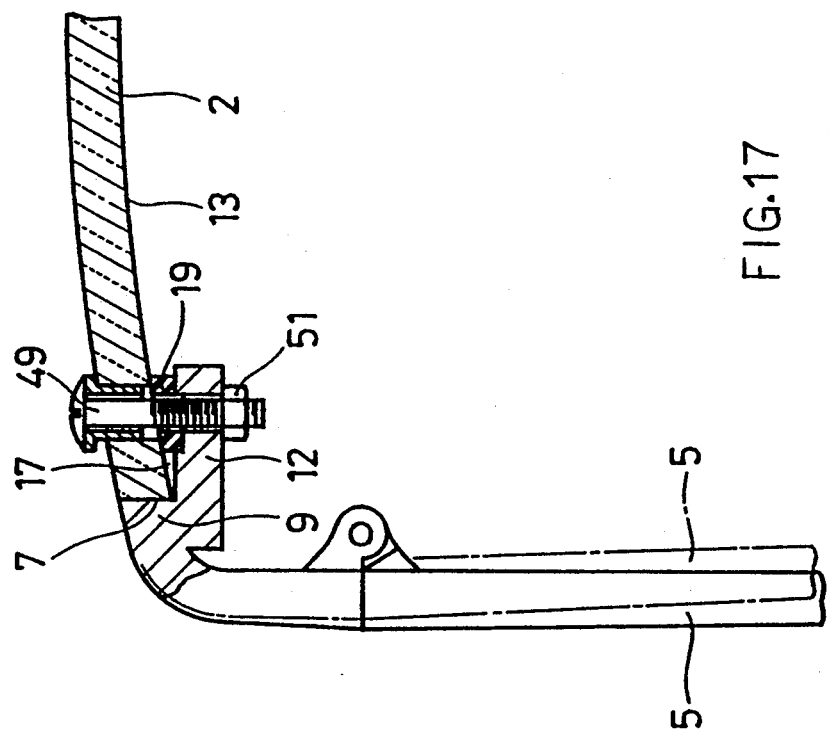
FIG. 17 is a sectional view showing attaching construction of the connecting member to the lens.
Figure 16:
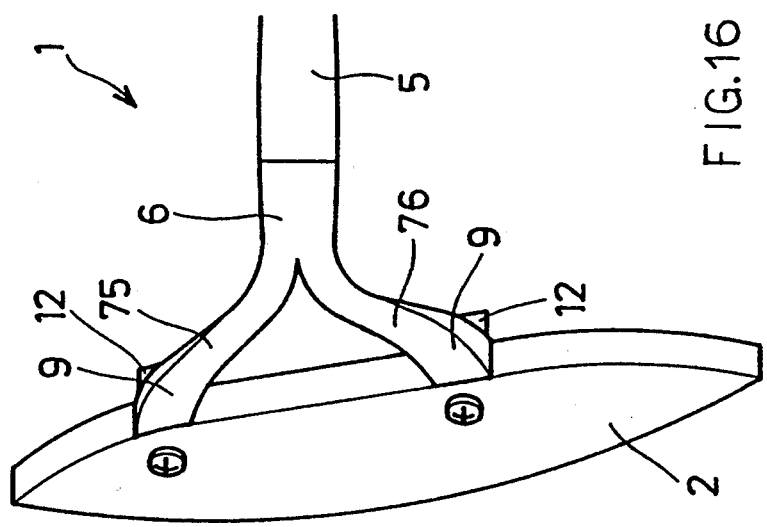
FIG. 16 is a side view showing the rimless spectacles according to the present invention in which a forward portion of the connecting member is separated to be a fork and the fix-projection is arranged on the side of the concave surface of the lens.

FIGS. 16 and 17, show another embodiment of the rimless spectacles 1 according to the present invention.

A connecting member 6 is integrally made of resin and the connecting members 6 is constructed to separate up and down to form two separate portions 75 and 76 at a forward portion thereof. Each of the separate portions 75 and 76 has a fix-projection 12 projecting inwardly of the lens 2 on the concave surface of the lens 2, and a contact portion 9 contacting with the periphery 7 of the lens 2.

The other construction of the connecting member 6 is the same as that of the first embodiment. Namely, a V-letter clearance 17 is formed between the fix-projection 12 and the concave surface 13 of the lens 2 to widen the clearance from the outer end to the inner end thereof. A packing 19 having flexibility is interposed in the V-letter clearance 17, and the packing increases its thickness from the outer end to the inner end thereof so as to contact the front surface of the packing with the concave surface of the lens and contact the rear surface thereof with the fix-projection. Further, from the side of the lens, a bolt 49 is inserted into each of openings of the lens 2, the packing 19 and the fix-projection 12, these openings having the common axis. A nut 51 is screwed on a screw portion of the bolt 49 which projects on the side of the fix-projection, so that the amount of compression of the packing 19 may be varied by changing the amount of tightening the nut. Namely, the maximum opening state of the temple can be controlled. The state of the temple 5, shown with a phantom line in FIG. 17, means that the temple is tilted inwardly due to compression of the packing.

Fourth Embodiment

Figure 19:
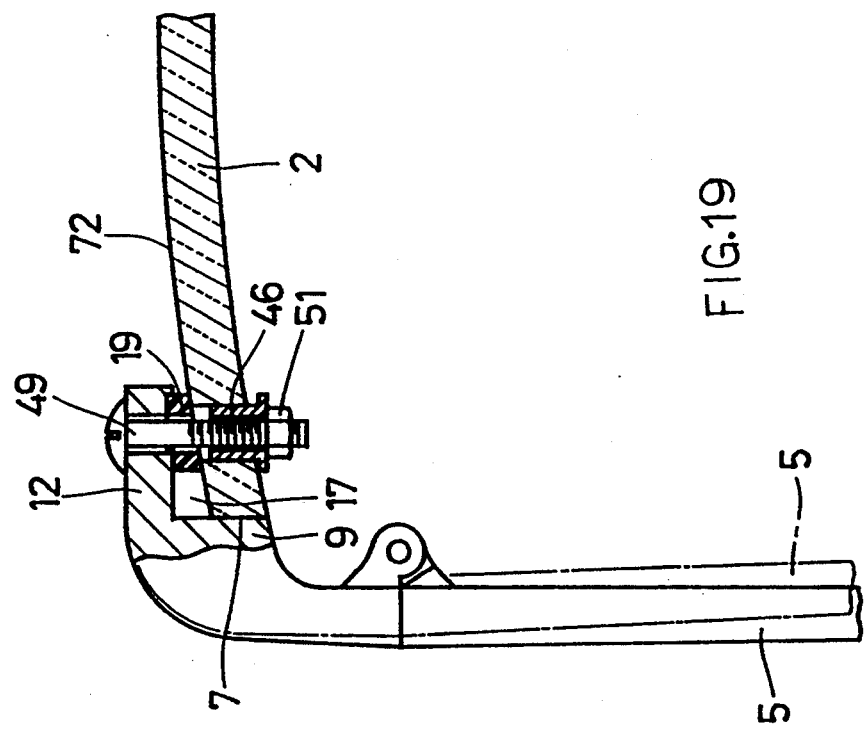
FIG. 19 is a sectional view showing the attaching construction of the connecting member to the lens in the cane of FIG. 18.
Figure 18:
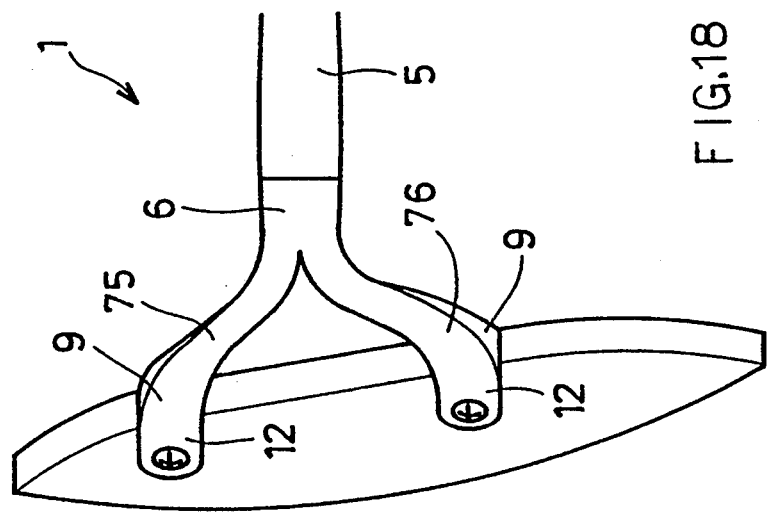
FIG. 18 is a side view of the rimless spectacles of the present invention in which a forward portion of the connecting member is separated to be a fork and the fix-projection is arranged on the side of the convex surface of the lens.
Figure 21:
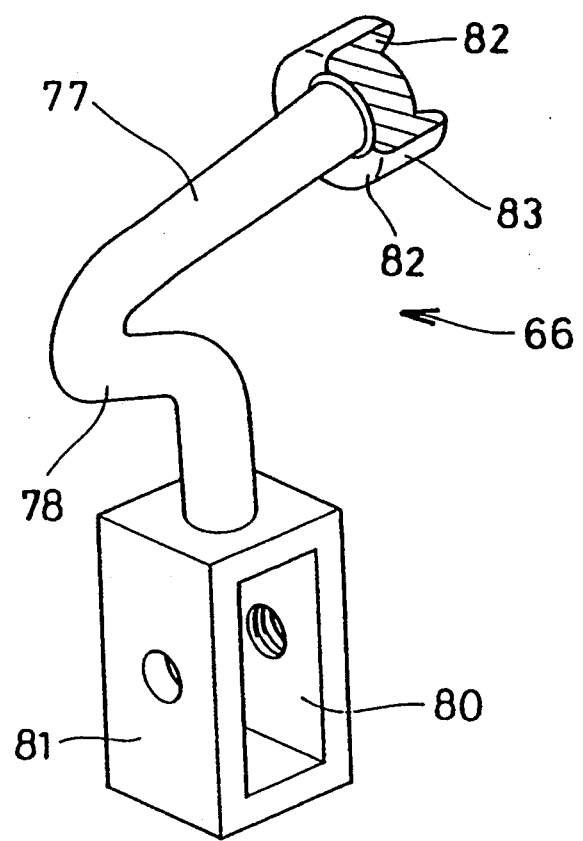
FIG. 21 is a perspective view, partly broken away, of a connecting arm which is made independently.
Figure 22:
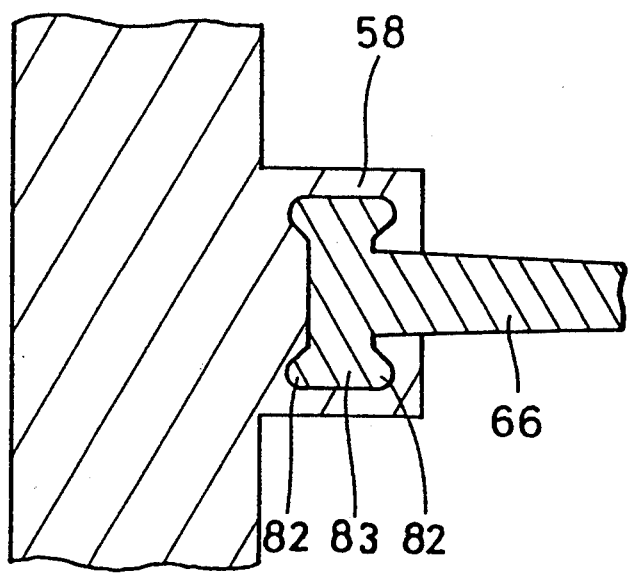
FIG. 22 is a sectional view showing the state that an anchor of the connecting arm is embeded in the base portion of the fix-projection.

FIGS. 18 and 19 show another aspect of the above menbodiment.

A connecting member 6 is constructed to separate up and down to form two separate portions 75 and 76 at a forward portion thereof. Each of the separate portions 75 and 76 has a fix-projection 12 projecting inwardly of the lens 2 on the side of the convex surface of the lens 2.

As is described in the second embodiment, a V-letter clearance 17 is formed between the fix-projection 12 and the convex surface 72 of the lens 2. A packing 19 having flexibility is interposed in the V-letter clearance 17. Further, from the side of the fix-projection 12, a bolt 49 is inserted into each of openings of the fix-projection 12, the packing 19 and the lens 2, these openings having the common axis. A nut 51 is screwed on a screw portion of the bolt 49 via a tube 46, which screw portion projects on the side of the lens 2, so that the amount of compression of the packing 19 may be varied by changing the amount of tightening the nut. Namely, the maximum opening state of the temple can be controlled. The state of the temple 5, shown with a phantom line in FIG. 19, means that the temple is tilted inwardly due to compression of the packing 19.

FIG. 20 shows another aspect of the bridge member 3 of the rimless spectacles according to the present invention.

The bridge member 3 has a gate portion which comprises contact portions 56 and 56 at both ends of a level connecting portion 53, said each contact portion 56 having contact surface 55 for the periphery of the lens 2. Each of the contact portions 56 and 56 is provided with a fix-projection 59 to project at the central portion of the rear surface thereof, and the fix-projection projects inwardly of the lens and has an opening 57 at the forward end thereof. A base portion 58 of the fix-projection 59 is provided with a connecting arm 66 of wire or rod, to an end of which a pad 60 is connected.

The connecting arm 66 is integrally made of relatively soft resin having flexibility in this embodiment. As shown in FIGS. 20 through 23, to form a U-letter, the connecting arm 66 is bent and turned forwardly and downwardly from a level projection 77 of the connecting arm 66 which extends rearwardly and horizontally, so that a turned portion 78 may be formed. The connecting arm 66 is formed to be thick at a base end thereof which is adjacent to the contact portion 56 of the bridge member. A box 81 is provided with an lower end of the turned portion 78 and the box has a space 80 which is long up and down for inserting a connecting projection 79 of the pad 60. The connecting arm 66 provides an anchor 83 at a base end of the level projection 77 which anchor is formed, for example, in the shape of a disc and the front and reverse sides of the peripheral portion of the disc are projecting, as shown with the numeral 82. The connecting arm 66 is provided with the fix-projection 59 to project therefrom in such a state that the anchor 83 is embeded in the base portion 59 of the fix-projection 59.

The bridge member having the above mentioned construction is shown in FIG. 11. When the bridge member is assembled in the rimless spectacles, it is difficult to vary the relative positions of the right and left lenses when the rimless spectacles are put on a wearer, since the gate portion is made of hard resin or relatively hard resin having flexibility. On the other hand, since the connecting arm 66 is made of springy materials, the nose pad 60 may fit the bridge of the nose of the wearer smoothly as the connecting arm is deformed or twisted flexibly, as shown with a phantom line in FIG. 20. In this embodiment, since the connecting arm 66 has the turned portion 78 of U-letter, its flexible deformtion may be carried out more smoothly.

Figure 23:
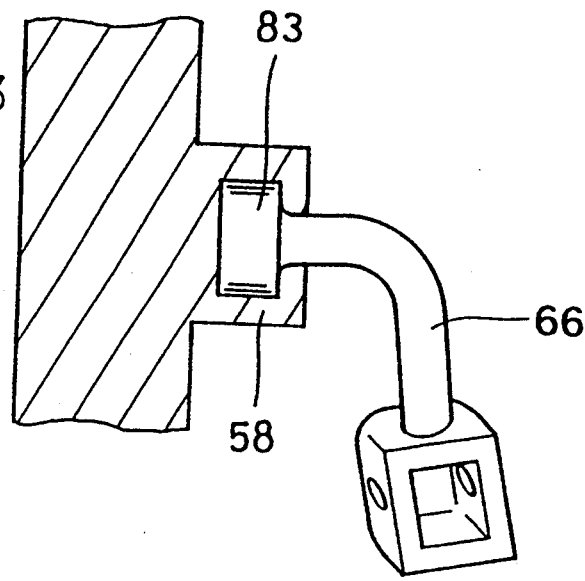
FIG. 23 is a perspective view showing another aspect of the connecting arm.
Figure 24:
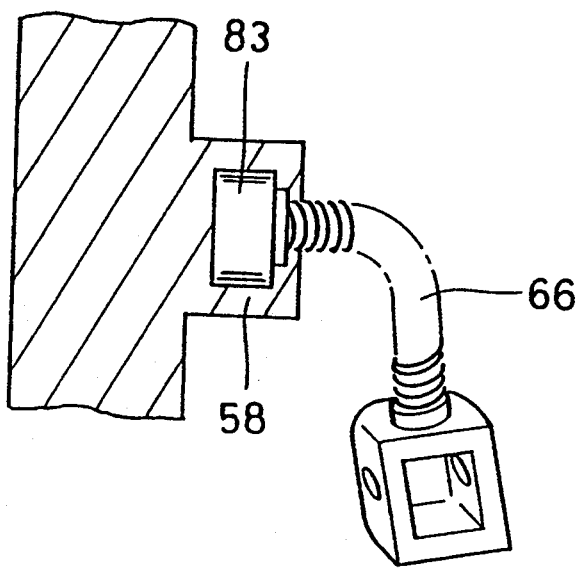
FIG. 24 is a perspective view showing a further aspect of the connecting arm.
Figure 25:
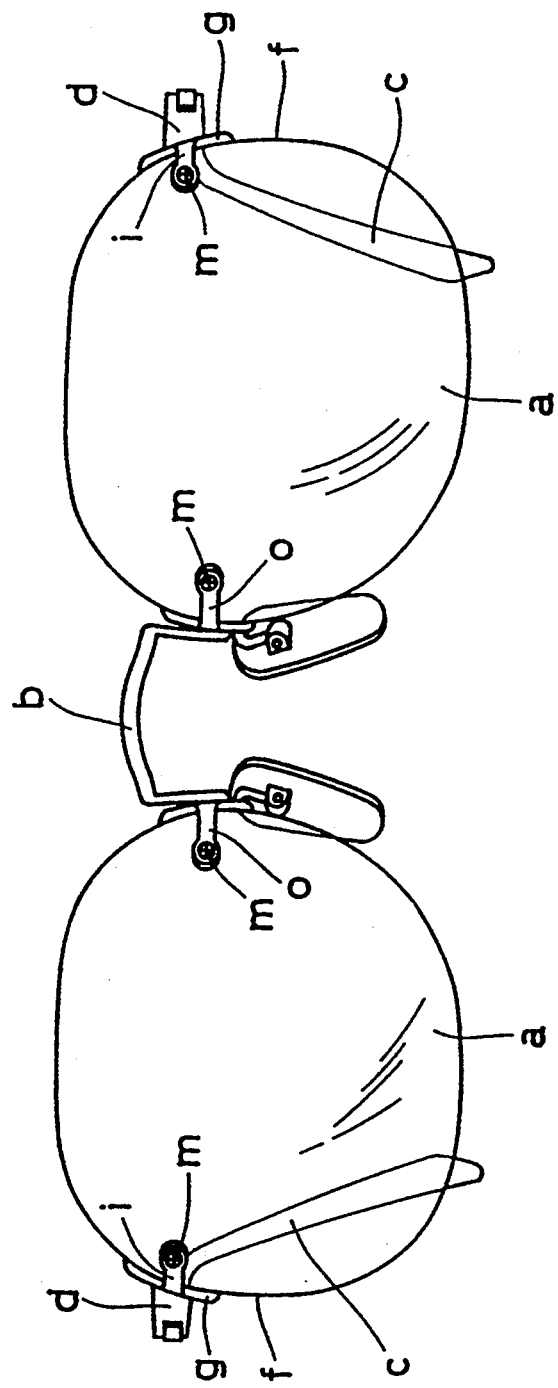
FIG. 25 is a front view showing rimless spectacles of the prior art.
Figure 26:
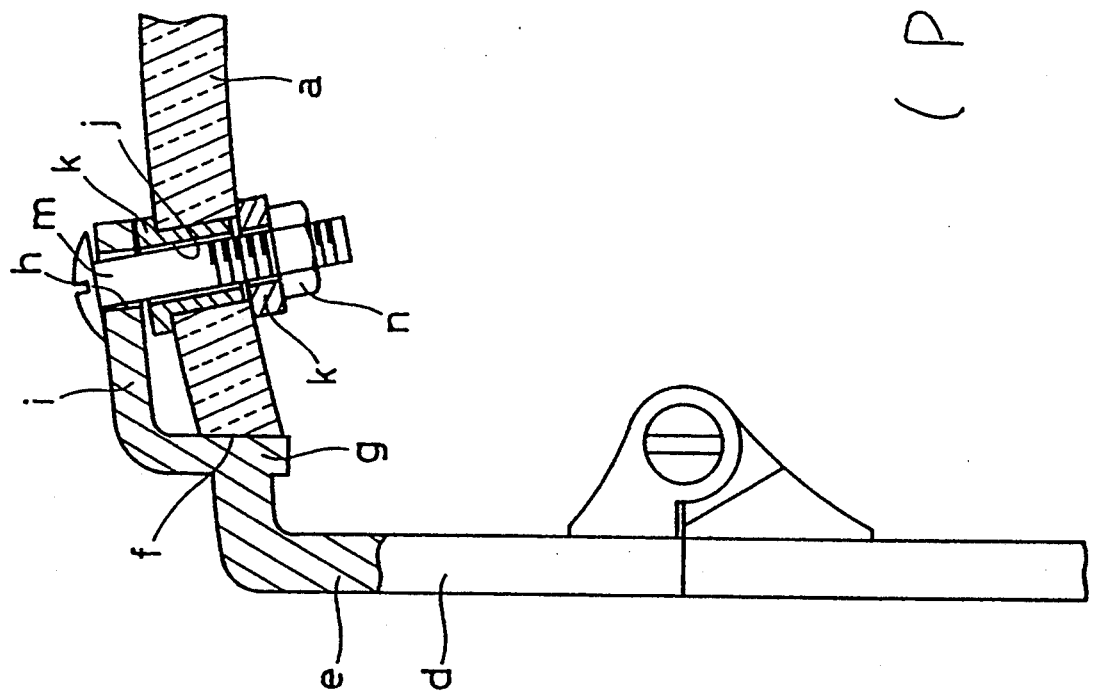
FIG. 26 is a sectional view showing the case that a bolt is adopted for the attaching construction of the connecting member to the lens and the attaching construction of the bridge member in the rimless spectacles of the prior art.
Figure 27:
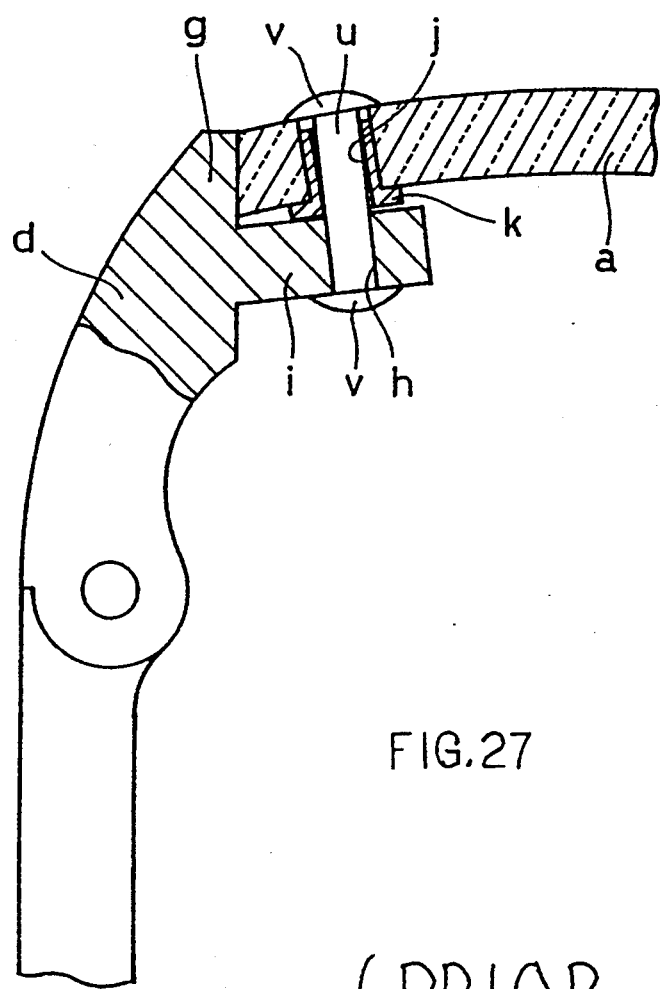
FIG. 27 is a sectional view showing the case that a rivet is adopted lot the attaching construction of the connecting member to the lens.

FIGS. 23 and 24 show an example of such a case that the connecting arm 66 of the bridge member in FIG. 20 is made of metal. The connecting arm of FIG. 23, is made of matal having high flexibility and an achor 83 is embedded in the base portion 58 of a fix-projection having the same construction as that of FIG. 20, said anchor having a shape of for example a disc. FIG. 24 shows a case that the connecting arm 66 is made in a shape of a coil spring and an anchor 83 of in the shape of for example a disc, is embeded in the base portion 58 of the fix-projection in the same manner as mentioned above.

What is claimed is:

1. In rimless spectacles having a pair of lenses with inside portions directly connected to each other by means of a bridge member at the inside portions of the lenses and a connecting member pivoted respectively to a forward end portion of a pair of temples, said connecting member being directly attached to the lenses, each said connecting member has a contact portion with respect to the periphery of the lens and has a fix-projection projecting inwardly of a concave surface of the lens in a state that the contact portion is contacted with the periphery of the lens, each said connecting member is constructed to form a V-letter clearance between the fix-projection and a concave surface of the lens to widen the clearance from an outer end to an inner end thereof, a flexible packing is interposed in the V-letter clearance and has a thickness which increases from the outer end to the inner end of the V-letter clearance so as to fit a front surface of the flexible packing on the concave surface of the lens and a rear surface thereof on the fix-projection of the connecting member, a bolt is inserted into each of the openings of the lens, the flexible packing and the fix-projection, and a nut is screwed on a screw portion of the bolt which projects on a side of the fix-projection or the lens, said nut being screwed to vary a tightening amount of the nut for controlling the opening of the temples.

2. The rimless spectacles as claimed in claim 1, wherein at least the contact portion of the connecting member is made of resin.

3. The rimless spectacles as claimed in claim 2, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

4. The rimless spectacles as claimed in claim 1, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

5. In rimless spectacles having a pair of lenses with inside portions directly connected to each other by means of a bridge member at the inside portions of the lenses and a connecting member pivoted respectively to a forward end portion of a pair of temples, said connecting member being directly attached to the lenses, each said connecting member has a contact portion with respect to the periphery of the lens and has a fix-projection projecting inwardly of a convex surface of the lens in a state that the contact portion is contacted with the periphery of the lens, each said connecting member is constructed to form a V-letter clearance between the fix-projection and a convex surface of the lens to widen the clearance from an outer end to an inner end thereof, a flexible packing is interposed in the V-letter clearance and has a thickness which increases from the inner end to the outer end of the V-letter clearance so as to fit a front surface of the flexible packing on the fix-projection of the connecting member and a rear surface thereof on the convex surface of the lens, a bolt is inserted into each of the openings of the fix-projection, the flexible packing and the lens, and a nut is screwed on a screw portion of the bolt which projects on the side of the fix-projection or the lens, said nut being screwed to vary a tightening amount of the nut for controlling the opening of the temples.

6. The rimless spectacles as claimed in claim 5, wherein at least the contact portion of the connecting member is made of resin.

7. The rimless spectacles as claimed in claim 6, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

8. The rimless spectacles as claimed in claim 5, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

9. In rimless spectacles having a pair of lenses with inside portions directly connected to each other by means of a bridge member at the inside portions of the lenses and a connecting member pivoted respectively to a forward end portion of a pair of temples, said connecting member being directly attached to the lenses, each of the connecting members is constructed to separate up and down to form two separate portions at a forward portion thereof, each of the separate portions having a fix-projection projecting inwardly of the lens on the concave surface of the lens, each said separation portion is constructed to form a V-letter clearance between the fix-projection and a concave surface of the lens to widen the clearance from an outer end to an inner end thereof, a flexible packing is interposed in the V-letter clearance and has a thickness which increases from the outer end to the inner end of the V-letter clearance so as to fit a front surface of the flexible packing on the concave surface of the lens and a rear surface thereof on the fix-projection of the separation portion, a bolt is inserted into each of the openings of the lens, the flexible packing and the fix-projection, and a nut is screwed on a screw portion of the bolt which projects on the side of the fix-projection or the lens, said nut being screwed to vary a tightening amount of the nut for controlling the opening of the temples.

10. The rimless spectacles as claimed in claim 9, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

11. In rimless spectacles having a pair of lenses with inside portions directly connected to each other by means of a bridge member at the inside portions of the lenses and a connecting member pivoted respectively to a forward end portion of a pair of temples, said connecting member being directly attached to the lenses, each of the connecting members is constructed to separate up and down to form two separate portions at a forward portion thereof, each of the separate portions having a fix-projection projecting inwardly of the lens on the convex surface of the lens, each said separation portion is constructed to form a V-letter clearance between the fix-projection and a convex surface of the lens to widen the clearance from the outer end to the inner end thereof, a flexible packing is interposed in the V-letter clearance and has a thickness which increases from the inner end to the outer end of the V-letter clearance so as to fit a front surface of the flexible packing on the fix-portion of the separation portion and a rear surface thereof on the convex surface of the lens, a bolt is inserted into each of the openings of the fix-projection, the flexible packing and the lens, and a nut is screwed on a screw portion of the bolt which projects on the side of the fix-projection or the lens, said nut being screwed to vary a tightening amount of the nut for controlling the opening of the temples.

12. The rimless spectacles as claimed in claim 11, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

13. In rimless spectacles having a pair of lenses with inside portions directly connected to each other by means of a bridge member at the inside portions of the lenses and a connecting member pivoted respectively to a forward end portion of a pair of temples, said connecting member being directly attached to the lenses, said bridge member has a contact portion at both of the ends thereof to fit a periphery of the lens respectively, and has a fix-projection projecting inwardly of the lens on a concave surface of the lens in a state that the contact portion is contacted with the periphery of the lens, said bridge member is constructed to form a V-letter clearance between the fix-projection and a concave surface of the lens to widen the clearance from an outer end to an inner end thereof, a flexible packing is interposed in the V-letter clearance and has a thickness which increases from the outer end to the inner end of the V-letter clearance so as to fit a front surface of the flexible packing on the concave surface of the lens and a rear surface thereof on the fix-projection of the bridge member, a bolt is inserted into each of the openings of the lens, the flexible packing and the fix-projection, and a nut is screwed on a screw portion of the bolt which projects on the side of the fix-projection or the lens, said nut being screwed to vary a tightening amount for tilting the positions of the lenses.

14. The rimless spectacles as claimed in claim 13, wherein at least the contact portion of the bridge member is made of resin.

15. The rimless spectacles as claimed in claim 13, wherein the bridge-member has a gate portion made of hard resin or flexible and relatively hard resin, which gate portion comprises contact portions at both ends of a level connecting portion, each said contact portions having a contact surface for the periphery of the lens, and a connecting arm is made to project from each of the contact portions to provide a pad at the forward end thereof, said connecting arm being made of springy materials.

16. The rimless spectacles as claimed in claim 15, wherein the connecting arm provides a U-letter portion in the middle portion thereof.

17. The rimless spectacles as claimed in claim 15, wherein the connecting arm is turned forwardly and downwardly to form a U-letter from a level projection of the connecting arm which extends rearwardly and horizontally.

18. The rimless spectacles as claimed in claim 15, wherein the connecting arm is made of relatively soft resin having flexibility.

19. The rimless spectacles as claimed in claim 15, wherein the connecting arm is formed to be thick at a base end thereof which is adjacent to the contact portion of the bridge.

20. The rimless spectacles as claimed in claim 15, wherein the connecting arm is made of metal having high flexibility.

21. The rimless spectacles as claimed in claim 15, wherein the connecting arm is made of a coil spring.

22. The rimless spectacles as claimed in claim 15, wherein the connecting arm provides an anchor at a base end thereof, which is adjacent to the contact portion of the bridge member, said anchor being embedded in the contact portion.

23. The rimless spectacles as claimed in claim 13, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

24. In rimless spectacles having a pair of lenses with inside portions directly connected to each other by means of a bridge member at the inside portions of the lenses and a connecting member pivoted respectively to a forward end portion of a pair of temples, said connecting member being directly attached to the lenses, said bridge member has a contact portion at both of the ends thereof to fit a periphery of the lens respectively, and has a fix-projection projecting inwardly of the lens on a convex surface of the lens in a state that the contact portion is in contact with the periphery of the lens, said bridge member is constructed to form a V-letter clearance between the fix-projection and a convex surface of the lens to widen the clearance from an inner end to an outer end thereof, a flexible packing is interposed in the V-letter clearance and has a thickness which increases from the inner end to the outer end of the V-letter clearance so as to fit a front surface of the flexible packing on the fix-projection of the bridge member and a rear surface thereof on the convex surface of the lens, a bolt is inserted into each of the openings of the fix-projection, the flexible packing and the lens, and a nut is screwed on a screw portion of the bolt which projects on the side of the fix-projection or the lens, said nut being screwed to vary its tightening amount for tilting the positions of the lenses.

25. The rimless spectacles as claimed in claim 24, wherein at least the contact portion of the bridge member is made of resin.

26. The rimless spectacles as claimed in claim 24, wherein the bridge member has a gate portion made of hard resin or flexible and relatively hard resin, which gate portion comprises contact portions at both ends of a level connecting portion, each said contact portions having a contact surface for the periphery of the lens, and a connecting arm is made to project from each of the contact portions to provide a pad at the forward end thereof, said connecting arm being made of springy materials.

27. The rimless spectacles as claimed in claim 26, wherein the connecting arm provides a U-letter portion in the middle portion thereof.

28. The rimless spectacles as claimed in claim 26, wherein the connecting arm is turned forwardly and downwardly to form a U-letter from a level projection of the connecting arm which extends rearwardly and horizontally.

29. The rimless spectacles as claimed in claim 26, wherein the connecting arm is made of relatively soft resin having flexibility.

30. The rimless spectacles as claimed in claim 26, wherein the connecting arm is formed to be thick at a base end thereof which is adjacent to the contact portion of the bridge.

31. The rimless spectacles as claimed in claim 26, wherein the connecting arm is made of metal having high flexibility.

32. The rimless spectacles as claimed in claim 26, wherein the connecting arm is made of a coil spring.

33. The rimless spectacles as claimed in claim 26, wherein the connecting arm provides an anchor at a base end thereof, which is adjacent to the contact portion of the bridge member, said anchor being embedded in the contact portion.

34. The rimless spectacles as claimed in claim 24, wherein the contact portion of the flexible packing for the fix-projection has a first engaging portion which is formed to be convex or concave, and the contact portion of the fix-projection has a second engaging portion which engages with the first engaging portion, so as to prevent relative rotation of the flexible packing and the bolt.

* * * * *